United States Patent [19]
Tsukamoto et al.

[11] Patent Number: 5,204,710
[45] Date of Patent: Apr. 20, 1993

[54] CAMERA HAVING ZOOM LENS SYSTEM

[75] Inventors: Takeya Tsukamoto; Masatoshi Itch, both of Osaka, Japan

[73] Assignee: Minolta Camera Kabushiki Kaisha, Osaka, Japan

[21] Appl. No.: 537,416

[22] Filed: Jun. 13, 1990

[30] Foreign Application Priority Data

Jun. 13, 1989 [JP] Japan ................. 1-151942
Jun. 13, 1989 [JP] Japan ................. 1-151943
Jun. 13, 1989 [JP] Japan ................. 1-151944
Jun. 13, 1989 [JP] Japan ................. 1-151946
Jun. 13, 1989 [JP] Japan ................. 1-151947
Jun. 13, 1989 [JP] Japan ................. 1-151948

[51] Int. Cl.$^5$ ............... G03B 5/00; G03B 13/36; H04N 5/232
[52] U.S. Cl. .................. 354/402; 354/195.1; 359/698; 358/227
[58] Field of Search ........... 354/195.1, 195.12, 195.13, 354/400, 402; 358/227; 350/429, 430; 359/696, 697, 698

[56] References Cited

U.S. PATENT DOCUMENTS

| 4,693,581 | 9/1987 | Yamaki et al. | 354/400 |
| 4,748,509 | 5/1988 | Otake et al. | 354/400 |
| 4,841,325 | 6/1989 | Hoshino et al. | 354/402 |
| 4,870,439 | 9/1989 | Tsuboi et al. | 354/195.12 |
| 4,896,177 | 1/1990 | Kazami et al. | 354/195.1 |
| 4,942,417 | 7/1990 | Miyazawa et al. | 354/400 |
| 4,951,075 | 8/1990 | Tokumaru et al. | 354/400 |
| 4,962,400 | 10/1990 | Otani et al. | 354/195.1 |
| 4,994,842 | 2/1991 | Itoh et al. | 354/402 |
| 5,010,358 | 4/1991 | Miyamoto | 354/402 |

Primary Examiner—W. B. Perkey
Attorney, Agent, or Firm—Price, Gess & Ubell

[57] ABSTRACT

A camera having a zoom lens system and detecting means for detecting photographic conditions such as distance to an object, a photographic magnification and like. Differentiation between a focal length range enabling a power zoom operation and a focal length range not enabling the power zoom operation is provided by the detecting means.

The zooming operation is permitted only to a short focal length side in a particular region determined by the distance to the object, the focal length and the like. Further, an auto zooming operation is permitted only in the particular region.

30 Claims, 15 Drawing Sheets

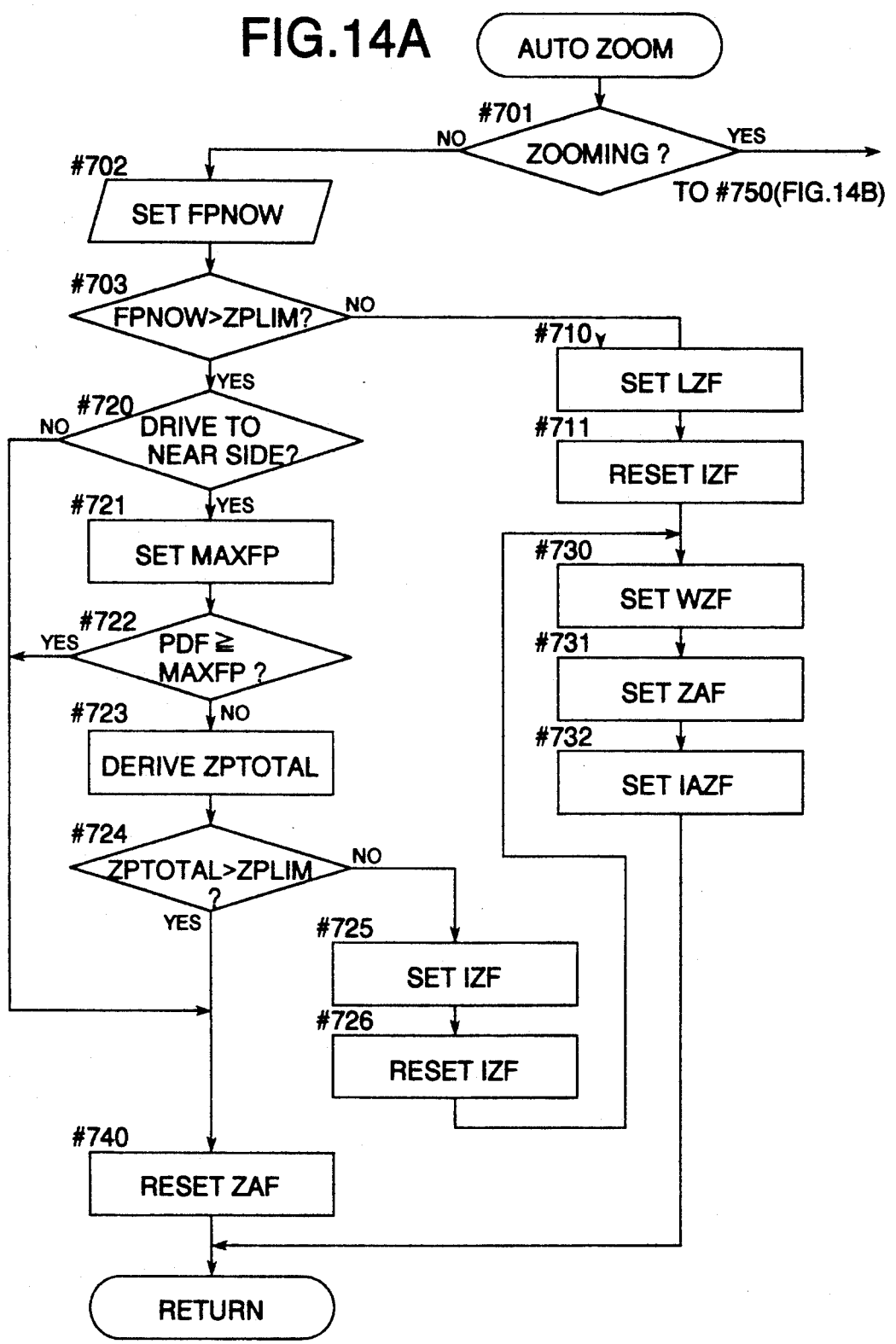

CAMERA HAVING ZOOM LENS SYSTEM

BACKGROUND OF THE INVENTION

1. Field of the Invention

The present invention relates to a camera having a zoom lens acting as a photographic lens. More particularly, the invention relates to a camera having a zoom lens driven by a motor for effecting a zooming operation. The invention also relates to a camera which detects photographic conditions such as a distance to a photographic object, and automatically effects a zooming operation in accordance with detected photographic conditions.

2. Description of the Prior Art

Conventional cameras include those which have what is known as a power zoom mechanism for effecting a zooming operation with motor drive. The cameras having the power zoom mechanism include a switch for designating a zooming direction. The photographer carries out zooming of the photographic lens by operating this switch. With the power zoom mechanism as noted above, the photographer tends to take photographs inadvertently at a high magnification side (long focus side). This often results in peripheral potions of a portrait or the like slipping out of a picture area, or a required background not shown within a picture area. Conversely, if a picture is taken at a low magnification side (shorter focal length), the photographer tends to pay attention only to an object in the center, with the consequence that the center object appears smaller in a finished photograph than was intended although the photographer believed that he or she took steps to obtain the center object in a large size. This is because the photographer failed to take into account photographic conditions such as a distance to the object, photographic magnification and the like.

Also known are cameras having what is known as an auto zoom mechanism for automatically zooming for a predetermined focal length corresponding to a distance to a photographic object. Generally, cameras having the auto zoom mechanism also include a power zoom mechanism, and hence a switch for selecting a zooming direction as well. With conventional cameras as noted above, the zoom lens is driven opposite to an auto zooming direction when the switch is operated for zooming opposite to the auto zooming direction during an auto zooming operation (i.e. while automatic zooming is effected for a focal length corresponding to a distance of an object). If the switch is released from the above state, the zooming direction will return to the auto zooming direction. Therefore, where the auto zoom mechanism is incorporated into a video camera or the like which photographs images continuously, and the above control operation is effected, the photographed images will have frequently changing field angles, which renders reproduced images difficult to switch.

Further, there is a known mechanism in which a focal length of a zoom lens is detected by an encoder pattern and a brush slidable thereon. However, the encoder pattern provides information only with a limited degree of precision, which makes it difficult to effect auto zoom control with high precision, for example.

Among the cameras having the power zoom mechanism and the autofocusing mechanism, there are those which, when a focusing lens is driven to an end of the shortest photographic distance during an autofocusing operation, automatically effects a zooming operation to the short focal length side accordingly (Japanese Patent Publication Kokai No. 60-143310). Zoom lenses of the inner focus type and rear focus type include those in which the shorter the focal length is, the smaller the focusing lens is extended with respect to objects at the same distance. The above cameras with this type of zoom lens have a function for enabling an autofocusing operation with respect to a nearby object as much as possible. With these cameras, however, since a zooming operation is effected only after the focusing lens is driven to the end of short photographic distance side, there occurs a time lag before an in-focus condition is attained in the short photographic distance side.

SUMMARY OF THE INVENTION

An object of the present invention is to provide a camera having a power zoom mechanism, which effectively prevents objects from being photographed in excessively large sizes or, conversely, in excessively small sizes.

Another object of the present invention is to provide a camera having an auto zoom mechanism, which involves no cumbersome variations in the field angle of a photographed image even when a power zoom switch is operated during an auto zoom operation.

Still another object of the present invention is to provide a camera enabling the focal length of a zoom lens to be detected with high precision.

A further object of the present invention is to provide a camera which automatically effects a zooming operation to a short focal length side when a photographic object is within a close range, and which minimizes a time lag occurring before an in-focus condition is attained.

The above objects are fulfilled, according to the present invention, by a camera comprising detecting means for detecting photographic conditions such as a distance to an object, a photographic magnification and the like, differentiation being made on detection results provided by the detecting means between a focal length range enabling a power zoom operation and a focal length range not enabling the power zoom operation. The zooming operation is permitted only to a short focal length side in a particular region determined by the distance to the object, the focal length and the like. Further, an auto zooming operation is permitted only in the particular region.

The foregoing other objects are fulfilled, according to the present invention, by a camera which does not effect a zooming operation by a power zoom switch even if the power zoom switch is operated during an auto zooming operation.

Further, the foregoing other objects are fulfilled, according to the present invention, by a camera comprising a first means for detecting a plurality of divided focal length ranges from encoder patterns, and a second means for detecting relative positions within each divided focal length range, thereby detecting a focal length with high precision. In this construction, zooming is effected by operating a control device, and the second detecting means is reset when the first detecting means detects an end of a divided range.

Still further, the foregoing other objects are fulfilled, according to the present invention, by a camera which detects prior to a focusing operation whether or not a photographic object lies closer to the camera than a predetermined distance, the focusing operation and a zooming operation to a short focal length side being carried out simultaneously when the object lies in a short distance side.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 7 through 12, 13A, 13B, 14A, 14B, and 15 are flowcharts of camera operations.

DETAILED DESCRIPTION OF THE PREFERRED EMBODIMENTS

Embodiments of the present invention will be described hereinafter with reference to the drawings.

Figure 1:
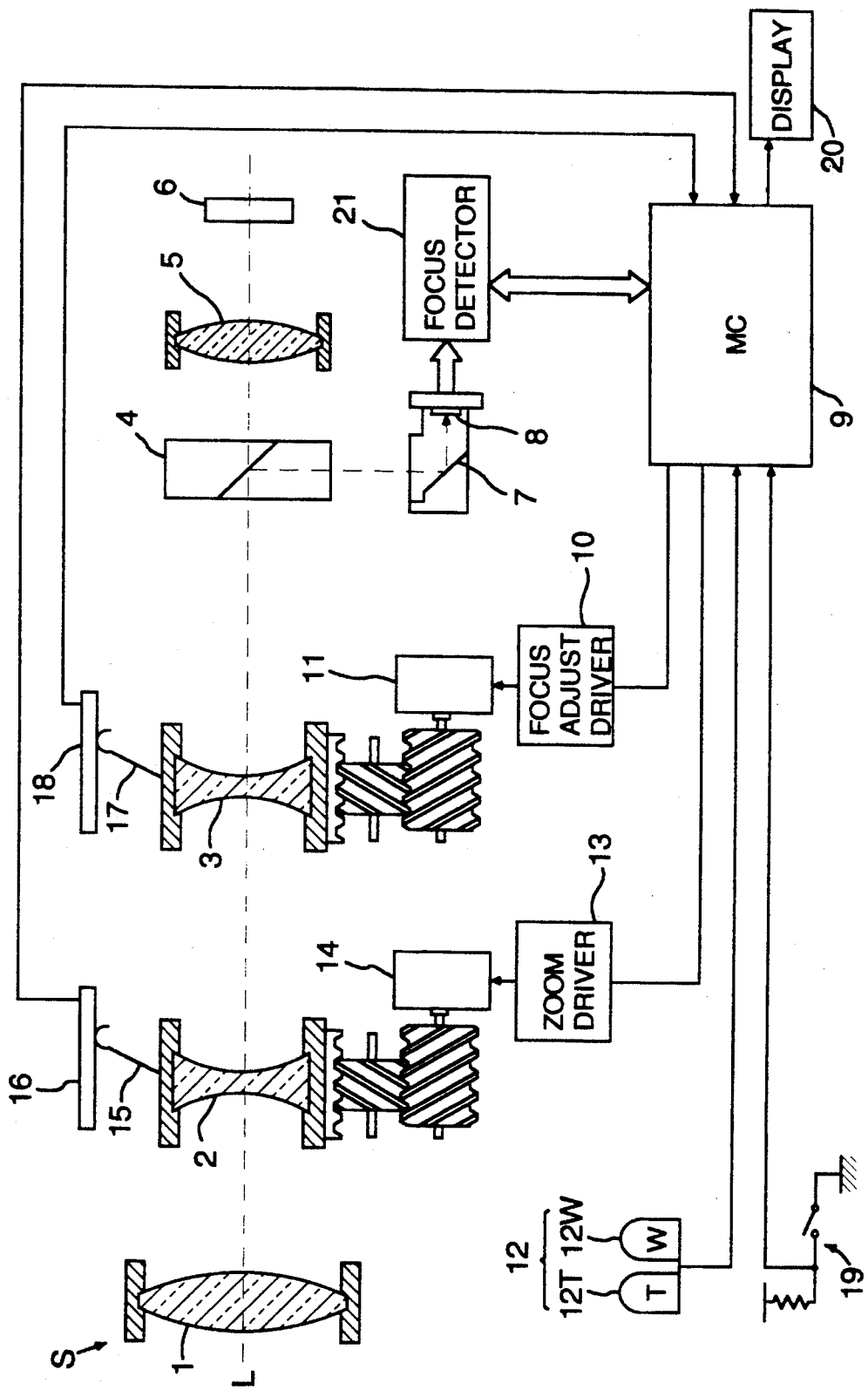
FIG. 1 is a schematic view of a photographic optical system and a control system of a camera according to the present invention.

FIG. 1 schematically shows a photographic optical system S and a control system of a video camera. The photographic control system S includes, as arranged in order from a forward end thereof, a fixed lens 1, a variator lens 2 movable along an optical axis L for continuously varying a focal length of the optical system S, a focusing lens 3 also movable along the optical axis L for effecting focus adjustment, a half prism 4 and a master lens 5. Images are formed on an image pickup device 6 comprising a CCD disposed rearwardly of the master lens 5.

Part of a light flux entering the photographic optical system S from a photographic object is divided out by the half prism 4, and reflected by a total reflection mirror 7 to impinge upon a focus detecting light receiver 8. An output signal resulting from photoelectric conversion by the light receiver 8 is transmitted through a focus detecting circuit 21 to a microcomputer 9. The microcomputer 9 determines from this output signal whether the photographic optical system S is in an in-focus condition with respect to the photographic object or not. If the optical system S is not in the in-focus condition, the microcomputer 9 outputs a control signal to a focus adjusting drive circuit 10 for placing the optical system S in the in-focus condition. In response to the control signal, the focus adjusting drive circuit 10 controls a focusing motor 11 comprising a stepper motor, to move the focusing lens 3 along the optical axis L, thereby effecting a focusing operation.

Numeral 12 denotes a power zoom direction switch manually operable to selectively depress a telephoto key 12T for increasing (or changing toward a telephoto side) the focal length of the photographic optical system S, and a wide key 12W for decreasing (or changing toward a wide side) the focal length of the optical system S. A signal indicative of the state of the power zoom direction switch 12 is input to the microcomputer 9. In response to this state signal, the microcomputer 9 outputs a control signal to a zoom drive circuit 13. In response to the control signal, the zoom drive circuit 13 controls a zoom motor 14 for moving the variator lens 2 along the optical axis L.

The variator lens 2 carries a position detecting brush 15 which is slidable, with the movement of variator lens 2, on a zoom encoder 16 extending parallel to the optical axis L. The zoom encoder 16 outputs to the microcomputer 9 a position detecting signal corresponding to a position of the variator lens 2. The microcomputer 9 determines the position of the variator lens 2 from this position detecting signal.

The focusing lens 3 also carries a brush 17 which is slidable, with the movement of focusing lens 3, on a focus encoder 18 extending parallel to the optical axis L. The focus encoder 18 outputs to the microcomputer 9 a position detecting signal corresponding to a position of the focusing lens 3. The microcomputer 9 determines the position of the focusing lens 3 from this position detecting signal.

Numeral 19 denotes a zoom mode switch for effecting a changeover, as will be described in detail later, between a normal mode in which zooming is carried out over an entire range in response to depression of the telephoto key 12T or wide key 12W, and an auto mode in which, besides the above operation, zooming is automatically controlled in accordance with a distance to the photographic object. A signal indicative of a state of this zoom mode switch 19 is input to the microcomputer 9.

As described later, the auto mode is automatically set upon power supply.

Numeral 20 denotes a display included in a viewfinder for displaying a focus area, a warning relating to close-up photography to be described later, and a warning relating to zooming prohibition.

The zooming operation of this video camera will be described in outline next.

Figure 2:
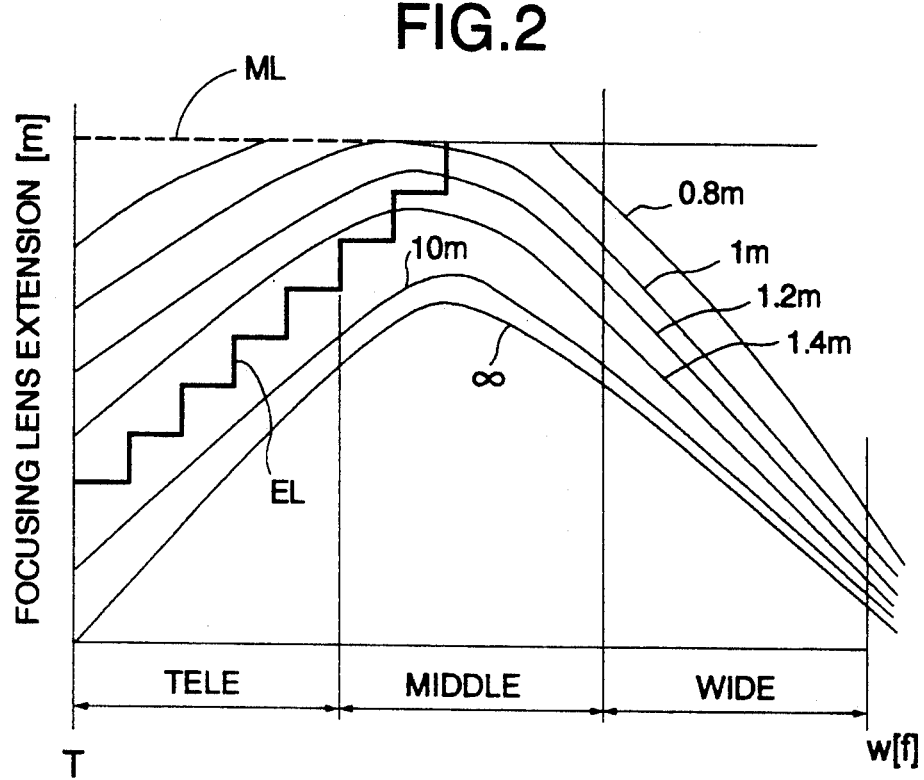
FIG. 2 is a graph showing a relationship between focal length and focusing lens extension.

FIG. 2 shows a relationship between a focal length "f" of the photographic optical system S in a zooming direction action and the amount of extension "m" of the focusing lens 3 obtained in the form of output voltage from the focus encoder 18.

This embodiment employs what is known as the inner focus type, in which the in-focus position of the photographic optical system S with respect to the same photographic distance varies with the movement of the variator lens 2 for varying the focal length. Thereafter, different focal lengths result in different amounts of extension variator the focusing lens 3 for placing the photographic optical system S in an in-focus condition with respect to objects at the same distance from the video camera.

Thin solid lines in FIG. 2 are described to show movement of the focusing lens 3 in relation to objects at certain photographic distances from the video camera, in which zooming is effected while maintaining in-focus conditions with respect to the objects. Broken line "ML" in FIG. 2 represents a maximum amount, due to mechanical limitation, of extension of the focusing lens 3, beyond which the focusing lens 3 cannot be extended forwardly. When the focusing lens 3 is moved above this broken line as occasion demands, the resulting picture will be out of focus. In this case, therefore, a warning as to short distance photography is provided on the display 20.

Figure 3:
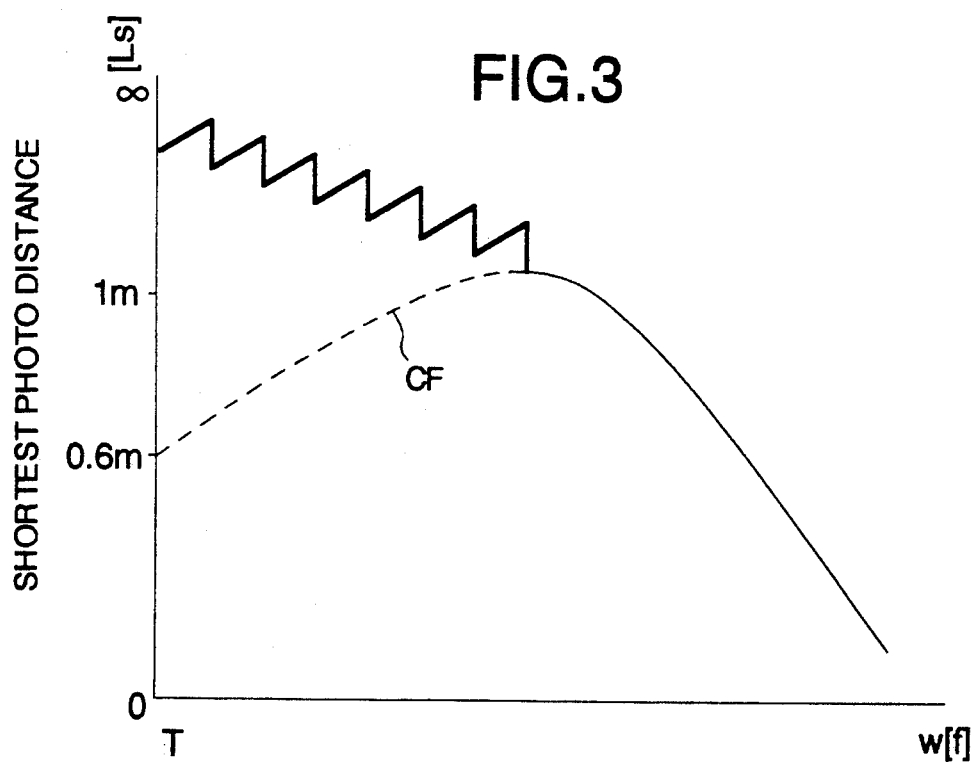
FIG. 3 is a graph showing a relationship between focal length and shortest photographic distance.

Since the maximum extension of the focusing lens 3 is determined mechanically as noted above, a broken line "CF" in FIG. 3 may be drawn for the shortest distance enabling photography, i.e. the shortest photographic distance "Ls", which is variable with the focal length. However, as shown in FIG. 2, the photographic optical system S has such lens characteristics that the amount of extension of the focusing lens 3 is small for both the telephoto side and the wide side and large for an intermediate range with respect to the same distance to an object, and therefore the shortest photographic distance in the telephoto side becomes shorter than in the intermediate range having a shorter focal length, as shown in line "CF". Consequently, when a photograph is taken in the telephoto side having a long focal length, photographic magnification becomes too large for an object to be included within the viewing field. With a system which effects focus detection using contrast of a photographic object, the contrast of portions of the object within the focus area for determining an in-focus condition is insufficient because the object is at a short distance and magnification is large. This is obstructive to the normal autofocusing operation.

To avoid such an inconvenience, the camera in this embodiment has, a part from the broken line "ML" in FIG. 2 which corresponds to the mechanical shortest photographic distance (hereinafter referred to as the mechanical limit line), a line "EL" drawn as a thick solid line in FIG. 2 which is electrically stepped in the telephoto side for limiting photographic ranges (hereinafter referred to as the electric limit line), for limiting the movement of the focusing lens 3 by comparison with the output voltage of the focus encoder 18. In the in-focus condition, the distance to the object is determined from the detection results provided by the focusing lens position detecting unit and variator lens position detecting unit and by using FIG. 2. Thus, the microcomputer 9 outputs the control signal to the zoom drive circuit 13 for automatically moving the variator lens 2 in a direction to decrease the focal length of the photographic optical system S, i.e. toward the wide side, when the distance obtained is shorter than a distance corresponding to the electric limit line "EL" (hereinafter referred to as the proximity limit distance), more specifically when the output voltage of the focus encoder 18 in a certain focal length condition is higher than a set voltage corresponding to the electric limit line EL in that focal length condition. In this way, photographs may be taken in the focal length condition without excessively large photographic magnification.

The zooming operation controlled by using the electric limit line "EL" corresponds to the auto mode noted hereinbefore, and the operation without such control, which enables a manual zooming operation, corresponds to the normal mode. The shortest photographic distance in the auto mode is shown in the solid line in FIG. 3.

When, in the auto mode, a photographic object is at a position lens than the proximity limit distance to the camera, the zooming operation is controlled as described hereinafter, in addition to automatic zooming to the wide side (hereinafter referred to as the auto zooming operation).

In this embodiment, the auto zooming operation is carried out by comparing the output voltage of the focus encoder 18 providing information as to the position of the focusing lens 3 relative to the photographic distance, with a voltage corresponding to the electric limit line "EL" which provides information as to a reference position of the focusing lens 3 corresponding to the proximity limit distance. To facilitate understanding, the following description will refer to the photographic distance and proximity limit distance.

(A) When the telephoto key 12T is manually depressed in the course of the auto zooming operation, the zooming operation is discontinued. That is, in this case, it is determined that the photographer has depressed the telephoto key 12T in an attempt to restore a previous field angle against the auto zooming operation. If a zooming operation toward the telephoto side based on the manual depression on the telephoto key 12T were carried out, an auto zooming operation toward the wide side would follow based on a determination that the object is less than the proximity limit distance to the camera at the release of the telephoto key 12T, thereby varying the field angle incessantly. The zooming operation is discontinued in order to avoid this inconvenience.

(B) It is possible to change the focal length to the telephoto side or to the wide side by depressing the telephoto key 12T or wide key 12W (hereinafter referred to as the manual zooming operation) when the auto zooming operation is not indicated, that is when a photographic object is further than the proximity limit distance. However, the manual zooming operation is discontinued when the proximity limit distance becomes greater than the distance to the object, i.e. the photographic distance, as a result of the manual zooming operation to the telephoto side.

In this case, as in the case (A) above, if the manual zooming operation to the telephoto side were continued, the field angle would be changed incessantly because of the auto zooming operation that follows. Such an inconvenience is avoided here too.

Figure 4A:
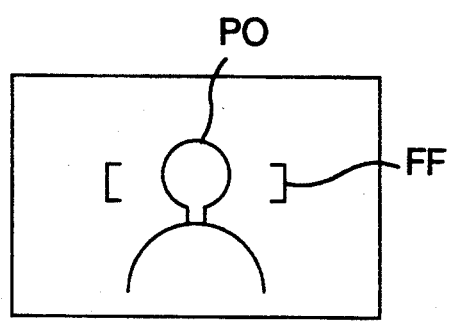
FIGS. 4A and 4B are front view of images appearing in a viewfinder.
Figure 4B:
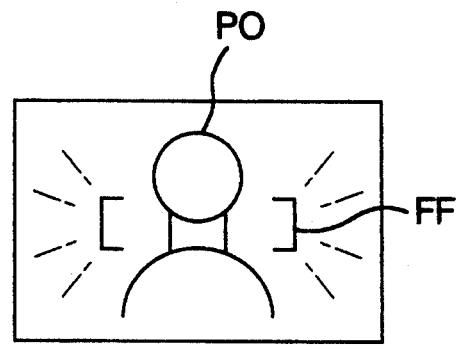

Further, in this case, a zooming prohibit warning is provided on the display 20. To describe this warning, FIG. 4A shows a normal image of a photographic object PO appearing on the display 20 in the viewfinder. When, in this photographic condition, a manual zooming operation to the telephoto side is carried out, thereby increasing the proximity limit distance over the photographic distance, and stopping the zooming operation, a focusing frame FF of the viewfinder image is flashed as shown in FIG. 4B until such condition is canceled, i.e. until the telephoto key 12T is released. Apart from the warning shown in the viewfinder, a sound alarm may also be given.

(C) When, in the photographic condition without the auto zooming operation being initiated, the photographic optical system S deviates from the in-focus condition with respect to the object in the focusing frame as a result of movement of the object, for example, the autofocusing operation is carried out for causing the focus adjusting circuit to move the focusing lens 3 in accordance with a deviation provided by the focus detecting circuit as described hereinbefore.

In this case, the object may move toward the camera so that the object becomes less than the proximity limit distance to the camera. If the autofocusing operation is carried out to follow the moving object, photographic magnification would become excessively large, thereby lowering contrast and reliability of focus detection.

Thus, a predicted photographic distance is obtained by adding an amount of variation in the photographic distance resulting from the focus adjusting operation based on the deviation provided by the focus detecting circuit, to the photographic distance corresponding to the current position of the focusing lens 3 detected by the focusing lens detecting unit. When the predicted photographic distance becomes less than the proximity limit distance, the autofocusing operation is carried out and the variator lens 2 is automatically moved to the wide side, thereby to change the focal length for the predicted photographic distance to be greater than the proximity limit distance (this operation being hereinafter referred to as the virtual auto zooming operation).

By carrying out the virtual auto zooming operation when the predicted photographic distance is smaller than the proximity limit distance, the autofocusing operation and zooming are effected simultaneously to reduce the time for preparing the photo-taking. This consumes less time than the case where, under the same circumstance, the autofocusing operation is carried out first, and then the auto zooming operation is carried out. In this way, photos may be taken with desired timing without fail.

Figure 5:
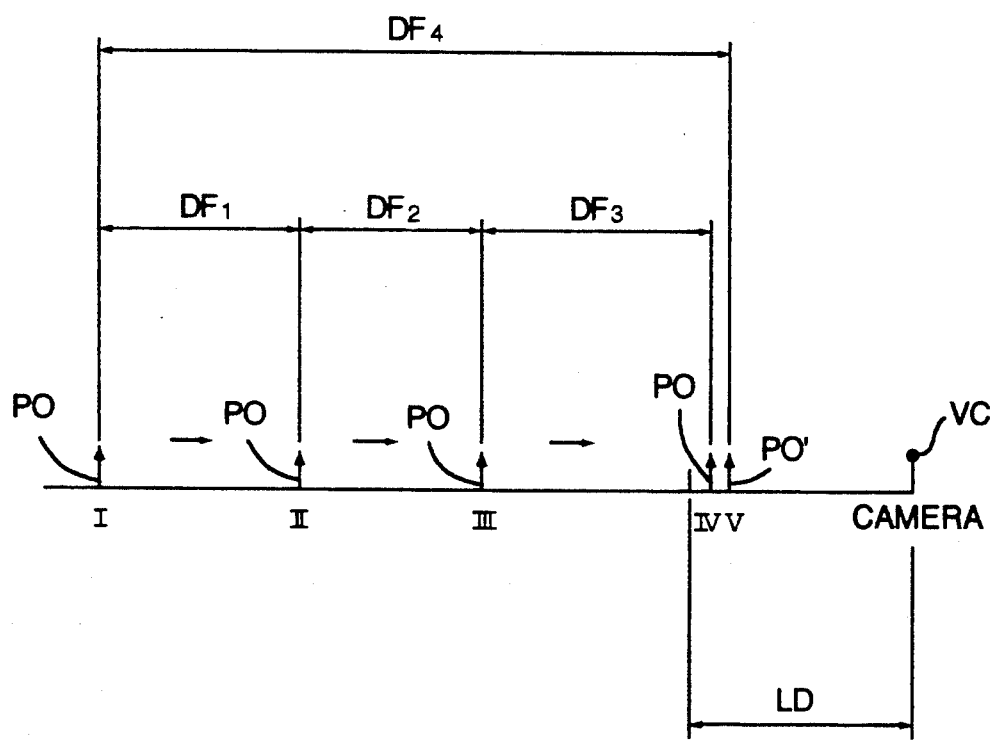
FIG. 5 is a schematic view illustrating a relationship between movement of the focusing lens and defocus amount.

The virtual zooming operation is not carried out when the deviation provided by the focus detecting circuit exceeds a certain predetermined value. This control will be described with reference to FIG. 5. In FIG. 5, distances from the video camera VC are taken along the horizontal axis.

Assume that the photographic object PO is currently at position I and that the video camera VC is in an in-focus condition with respect to the object PO. When the object PO gradually moves toward the vide camera VC and arrives at position II, the focus detecting circuit provides a deviation (hereinafter referred to as the defocus amount) DF1 with respect to the object PO at that position. An autofocusing operation is carried out based on the defocus amount DF1. When the photographic object PO subsequently moves to position III, an autofocusing operation is carried out based on a defocus amount DF2 obtained likewise. When the photographic object PO moves further to positive IV which is less than the proximity limit distance LD to the video camera VC, an autofocusing operation is carried out based on a defocus amount DF3 obtained likewise, and an auto zooming operation to the wide side is carried out at the same time as described hereinbefore.

Assume that a different object PO' passes through position V in FIG. 5 which is less than the proximity limit distance LD to the video camera VC when the photographic object PO is at position I and the video camera VC is in the in-focus condition with respect to the photographic object PO. Then, the virtual auto zooming operation would bring about the zooming operation to the wide side to vary the field angle extensively, although the intended photographic object PO is not in movement, and the different object PO' would be focused inadvertently.

Thus, when defocus amount DF4 obtained is greater than the predetermined defocus amount as in this case, it is determined that the intended photographic object PO has not moved, and photo-taking is continued in the same photographic condition without effecting the zooming operation.

However, there are cases in which the photographer intends to photograph the closer object. Thus, the autofocusing operation is continued and the virtual auto zooming operation is carried out for gradually decreasing the defocus amount DF with the movement of the focusing lens 3.

(D) After the auto zooming operation is initiated, photographic distance information provided by a distance information detecting unit and the proximity limit distance in each focal length condition are repeatedly compared on the basis of detections made by the focusing lens position detecting unit and variator lens position detecting unit. The variator lens 2 is stopped to complete the auto zooming operation when the photographic distance exceeds the proximity limit distance.

When the focal length of the camera is set to be long, i.e. set to a photographic condition for the telephoto side, photography with a narrow depth of field or with a telephotographic effect is often intended. The foregoing auto zooming operation, therefore, enables photography at a possible telephoto condition in order to allow the above photographic intention to the full extent even while avoiding the photography with the excessively large magnification or with low reliability of the autofocusing operation.

Specifically, the auto zooming operation is stopped as follows:

(i) Where, as described above, the auto mode is automatically set immediately after the zoom mode switch 19 is operated to change from the normal mode to the auto mode and immediately after power is supplied, the current photographic distance may be smaller than the proximity limit distance even if a photographic object is standing still. In such a case, an auto zooming operation is carried out as described earlier (which is hereinafter referred to as the limit auto zooming operation).

Figure 6A:
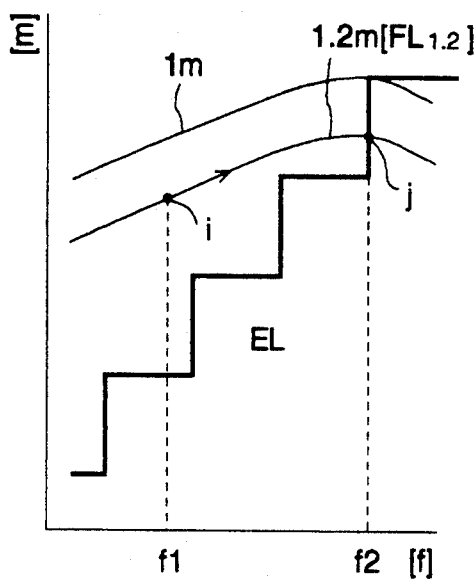
FIGS. 6A through 6D are views illustrating movement of the focusing lens.

This operation will be described with reference to FIG. 6A. FIG. 6A is an enlarged view of a portion of FIG. 2. Assume that, prior to the limit auto zooming operation, the focal length is "f1" and the focusing lens 3 is at a position "i" of in-focus condition with respect to a photographic object at a position of "1.2 m". When the limit auto zooming operation is carried out in this state, zooming is effected to reduce the focal length (rightward in FIG. 6A). As a result, the focusing lens 3 moves along a line "FL1.2" since the photographic object is stationary. The limit auto zooming operation is completed when the focal length becomes "f2". At this time, the focusing lens 3 is at a position "j".

(ii) The virtual auto zooming operation is carried out as already described, when the photographic distance is expected to become smaller than the proximity limit distance with a photographic object approaching.

Figure 6B:
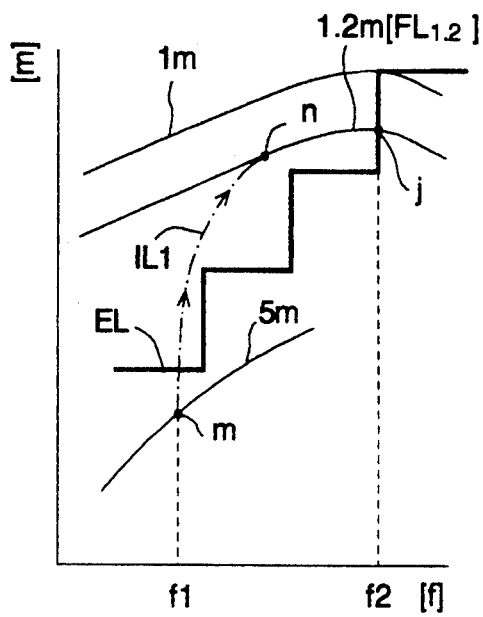

This operation will be described with reference to FIG. 6B. FIG. 6B is also an enlarged view of a portion of FIG. 2. Assume that, prior to the virtual auto zooming operation, the focal length is "f1" and the focusing lens 3 is at a position "m" of in-focus condition with respect to a photographic object at a position of "5 m". When, in this state, the object moves to a position of "1.2 m", the virtual photographic distance is calculated to be "1.2 m" from the deviation provided by the focus detecting circuit. The virtual auto zooming operation is carried out since this virtual photographic distance is smaller than the proximity limit distance in the focal length condition.

Then, zooming is effected to reduce the focal length (rightward in FIG. 6B), and an autofocusing operation is carried out. With the combination of the two operations, the focusing lens 3 moves from the position "m" along a dot-and-dash line "IL1.2" toward the line "FL1.2".

Normally, the variator lens 2 is movable for focal length variations by a maximum amount of 20 mm, for example, whereas the focusing lens 3 is movable for focus adjustment by a maximum amount of about 2 mm. Since the amount of movement of the focusing lens 3 is smaller than that of the variator lens 2, the line "IL1" has a sharp inclination as illustrated. The focusing lens 3 reaches a position "n", and thereafter, as in the case (i) above, moves along the line "FL1.2". The virtual auto zooming operation is completed when, as in the foregoing case, the focal length becomes "f2". At this time, the focusing lens 3 is at a position "j" also.

(E) When the virtual zooming operation is carried out, the movement takes place as noted in (ii) of section (D) above. The virtual auto zooming operation is completed when the proximity limit distance becomes smaller than the photographic distance. However, when the movement of the focusing lens 3 does not cross the electric limit line "EL", as described hereunder, an inconvenience will result from the control described in section (D) for completing the virtual auto zooming operation.

Figure 6C:
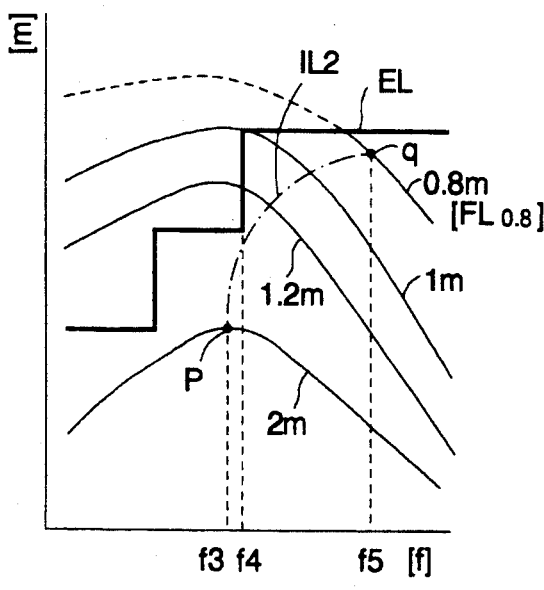

An operation carried out in this case will be described with reference to FIG. 6C. FIG. 6C is also an enlarged view of a portion of FIG. 2. Assume that, prior to the virtual auto zooming operation, the focal length is "f3" and the focusing lens 3 is at a position "p" of in-focus condition with respect to a photographic object at a position of "2 m". When, in this state, the object moves to a position of "0.8 m", the virtual photographic distance is calculated to be "0.8 m" from the deviation provided by the focus detecting circuit. The virtual auto zooming operation is carried out since this virtual photographic distance is smaller than the proximity limit distance in the focal length condition.

Then, zooming is effected to reduce the focal length (rightward in FIG. 6C), and an autofocusing operation is carried out. With the combination of the two operations, the focusing lens 3 moves from the position "p" along a dot-and-dash line "IL2" toward the line "FL0.8". Since the movement for focus adjustment is faster as described hereinbefore, the line "IL2" has a sharp inclination and extends upward in an initial stage of movement as illustrated. However, since the line, e.g. the above-mentioned line "FL0.8" drops rightward in the short focal length side of a certain focal length "f4", zooming to the wide side causes the focusing lens 3 to be extended once and then retracted as illustrated. On the other hand, the electric limit line "EL" extends horizontally as illustrated, for example, instead of dipping rightward, in order to avoid an increase in the proximity limit distance in the short focal length side of the focal length "f4". Thus, the line "IL2" of movement of the focusing lens 3 does not intersect the electric limit line "EL".

If the control described in section (D) were effected in this case, the variator lens 2 and focusing lens 3 would be stopped after slight movement in accordance with the determination that the photographic distance detected by the distance information detecting unit is greater than the proximity limit distance, the former being always greater than the latter, and then the virtual auto zooming operation would be resumed on the result of comparison between the predicted photographic distance and proximity limit distance. Thus, the zooming operation would be bumpy with alternating movement and stoppage of the variator lens 2 and focusing lens 3. This would not only give an unpleasant feeling but would consume an increased period of time before an in-focus condition is attained for photography.

Thus, in such a case, the virtual auto zooming operation is completed when the movement of the focusing lens 3 changes from an extension side to a retraction side, rather than when the photographic distance becomes greater than the proximity limit distance.

Specifically, the final destination for the focusing lens 3 in this case is on the line "FL0.8" corresponding to the predicted photographic distance. This destination corresponds to a position "q" in FIG. 6C where the line "IL2" of movement of the focusing lens 3 intersects the above-mentioned line "FL0.8".

Figure 6D:
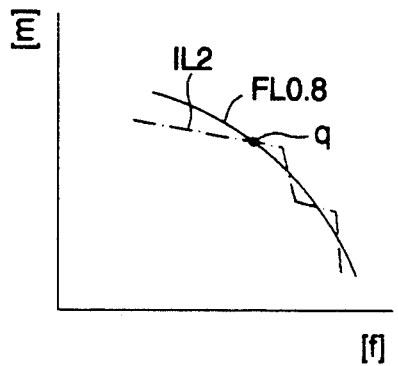

A close observation of the movement of focusing lens 3 adjacent this position will reveal that, as shown in FIG. 6D, the focusing lens 3 approaches the position for realizing the photographic distance of "0.8 m" from a side for realizing a greater photographic distance on the basis of a detected deviation. In the autofocusing operation in general, control is effected by providing a dead zone across an in-focus position in order to eliminate drift of the focusing lens 3 adjacent the in-focus position. In the optical system S of the inner focus type as in this embodiment, however, the focusing lens 3 moves with zooming as also shown in FIG. 2. Therefore, the autofocusing operation during zooming is controlled without a dead zone, in order to effect focus adjustment positively following defocusing due to the zooming. For this purpose, the focusing lens 3 is once placed in the in-focus condition, and then overshoots this condition. Then, the focus detecting circuit provides a deviation for the retraction side. Subsequently, the focusing lens 3 moves along the line "FL0.8", repeatedly crossing the line "FL0.8" as illustrated.

As described above, the change of the deviation provided by the focus detecting circuit from the extension side to the retraction side forms the basis for determining that the focusing lens 3 has moved into the condition for realizing the photographic distance of "0.8 m". Upon this determination, the virtual auto zooming operation is completed. Even when the focusing lens 3 moves without crossing the electric limit line "EL" during the virtual auto zooming operation, the virtual auto zooming operation may be completed after establishing the desired condition and without involving an unnatural zooming operation.

(F) The comparison between the current photographic distance or predicted photographic distance and the proximity limit distance is made for controlling a zooming operation whether it is the limit auto zooming operation or the virtual auto zooming operation. As described hereinbefore, apart from the mechanically shortest photographic distance determined by the range through which the focusing lens 3 is mechanically movable, the proximity limit distance is set to be the longer the greater the focal length is, as a reference value for comparison with the information on the position of the focusing lens 3.

The control for the zooming operation based on the proximity limit distance, namely the zooming in the auto mode, is provided in order not to photograph a nearer object in a long focal length condition, thereby to prevent photographic magnification from becoming excessively large and reliability of the autofocusing operation from becoming poor due to the enlarged magnification, as described hereinbefore.

The proximity limit distance may, therefore, be set to a continuously changing linear or curved form, which will assure higher precision, instead of being stepwise as in this embodiment. To achieve this, it is necessary to continuously detect the position of variator lens 2, thereby continuously grasping variations in the focal length. This will result in complication and high cost of the encoder or other detecting mechanism.

In this embodiment, therefore, the position of the variator lens 2 is detected for determining the focal length condition, in three stages as shown in FIG. 2, for example, which includes the telephoto range, wide range and middle range.

If the proximity limit distance were set for the three ranges, the same proximity limit distance would be applied to an excessively large range, which could not produce satisfactory results. Thus, each of the three regions for which the focal length condition is detected is divided into a plurality of equal parts, and the proximity limit distance is set for each of such divided parts. This results in the stepwise variations as shown in FIG. 2.

Specifically, the zooming in the auto mode may be carried out at a constant speed, and a shift from one of the three regions to another is detected by a change in the conducting pattern of the zoom encoder 16. The proximity limit distance is varied step by step with lapse of each period corresponding to a period required from the above change to the end of one region divided by the number of the above parts.

It is therefore possible to renew the proximity limit distance with the zooming during normal photography in the auto mode in which zooming is carried out frequently. However, when the control for the zooming operation in the auto mode has not been effected, with the auto mode automatically set immediately after switching is made from the normal mode to the auto mode or immediately after power is supplied, as described hereinbelow, the conducting pattern of the zoom encoder 16 indicates to which of the three ranges the focal length condition pertains, but does not identify any of the divided parts of that range.

In this embodiment, when power is supplied or when switching is made from the normal mode to the auto mode, the variator lens 2 is once driven to effect zooming to the wide side or telephoto side, preferably to the wide side. The variator lens 2 is stopped upon detection of a change in the conducting pattern of the zoom encoder 16. At this time, the proximity limit distance corresponding to the focal length, that is the proximity limit distance (hereinafter referred to as the initial proximity limit distance) corresponding to the divided part in the middle or wide range having the greatest focal length, is read from among a plurality of proximity limit distances stored in a memory or the like. This proximity limit distance is set as a reference for comparing with the current photographic distance or predicted photographic distance. Thereafter control is started for the zooming operation in the auto mode.

The initial setting of the initial proximity limit distance is unnecessary in the absence of movement of the variator lens 2 in the normal mode even when switching is made from the normal mode to the auto mode. Such an initial setting involves the wasteful time and trouble of a zooming operation to the wide side at the switching time, and may result in loss of photographic timing.

This situation is avoided by storing the proximity limit distance initially set or renewed as the reference value in the auto mode, and by detecting and storing the presence or absence of a zooming operation in the normal mode. If a zooming operation has not been carried out in the normal mode, the initial setting of the initial proximity limit distance immediately following the switching to the auto mode is omitted.

As a whole, therefore, the construction for detecting the focal length is simple and inexpensive, and yet enables delicate control of the zooming operation without impairing the auto zooming operation following the initial state, which is achieved by providing an increased number of stages for variations in the proximity limit distance.

The way in which the foregoing video camera operates will be described further with reference to the flowcharts shown in FIGS. 7 through 15. The terms "photographic distance" and "proximity limit distance" used in the following description of the flowcharts refer to information as to the position of focusing lens 3 and information as to the reference position of focusing lens 3, namely both to information corresponding to amounts of extension of focusing lens 3.

Figure 7:
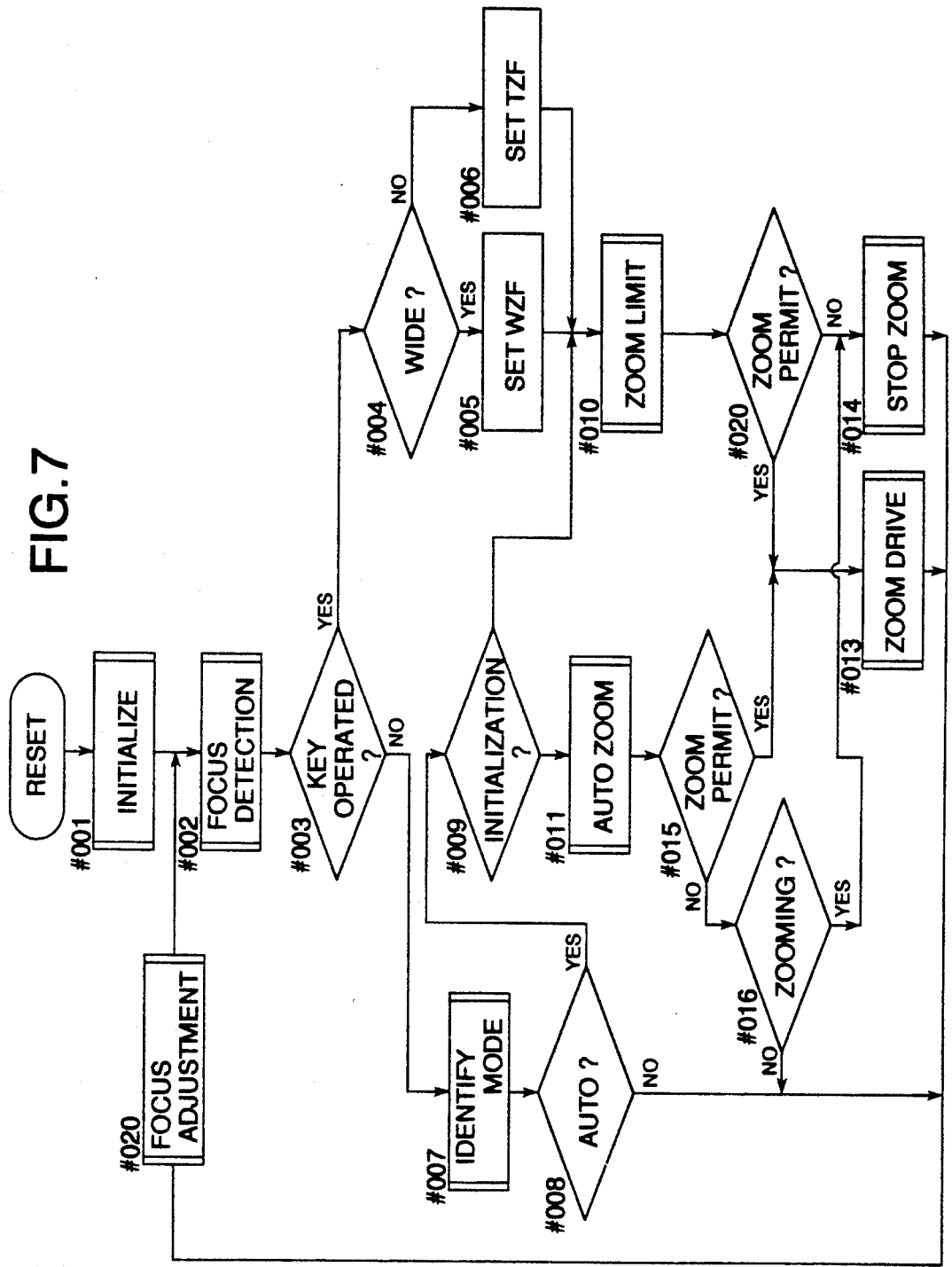

FIG. 7 shows a main routine or "power-on reset" routine started with a hardware interrupt made by switching on the video camera.

Figure 8:
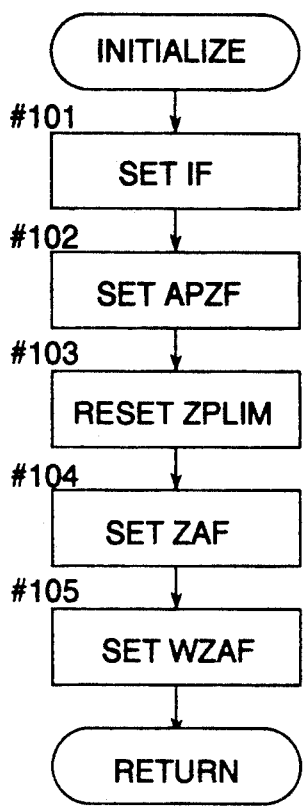

When this routine is started, an initialize subroutine is called at step #001 to prepare for initialization and initial setting of the initial proximity limit distance noted hereinbefore. FIG. 8 shows a flowchart of the initialize subroutine. When this subroutine is called, an initial flag IF is set at step #101, an auto mode flag APZF is set for the auto zooming mode at step #102, the proximity limit distance ZPLIM is reset at step #103 for reading the initial proximity limit distance, a zoom permit flag ZAP is set at step #104 for enabling zooming, and a wide side drive flag WZF is set at step #105 for setting a zooming direction to the wide side. Thereafter the program returns to the "power-on reset" routine.

Figure 9:
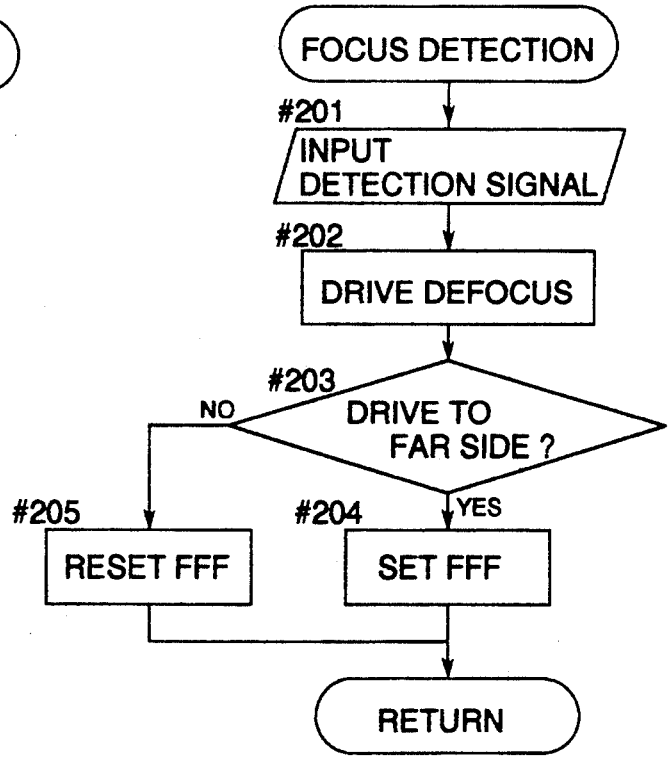

Referring back to FIG. 7, after the return from the initialize subroutine, a focus detecting subroutine is called at step #002. FIG. 9 shows a flowchart of this subroutine. When this subroutine is called, the focus detection output signal of the light receiver 8 is input at step #201. This signal is used for calculating a deviation of the photographic optical system S from the in-focus position with respect to a photographic object. The deviation is converted to a defocus amount PDF or drive pulses for driving the focusing motor 11 (step #202). Then, the movement of the focusing lens 3 is determined to be in the retraction side (far side) or extension side (near side) (step #203). If it is in the retraction side, a far side drive flag FFF is set at step #204. If it is in the extension side, the far side drive flag FFF is reset at step #205. Thereafter, the program returns to the "power-on reset" routine.

Referring back to FIG. 7, after the return from the focus detecting subroutine, the power zoom switch 12 is checked at step #003. If the power zoom switch 12 is operated for either the telephoto side or the wide side, the depressed key is identified at step #004. If the wide key 12W is depressed, the wide side drive flag WZF is set at step #005. Otherwise, a telephoto side drive flag TZF is set at step #006. Then a zoom limit operating subroutine is called at step #010. This subroutine will be described later.

If, on the other hand, step #003 finds that the power zoom switch 12 has not been operated at all, the program moves to step #007 and calls a mode identifying subroutine.

Figure 10:
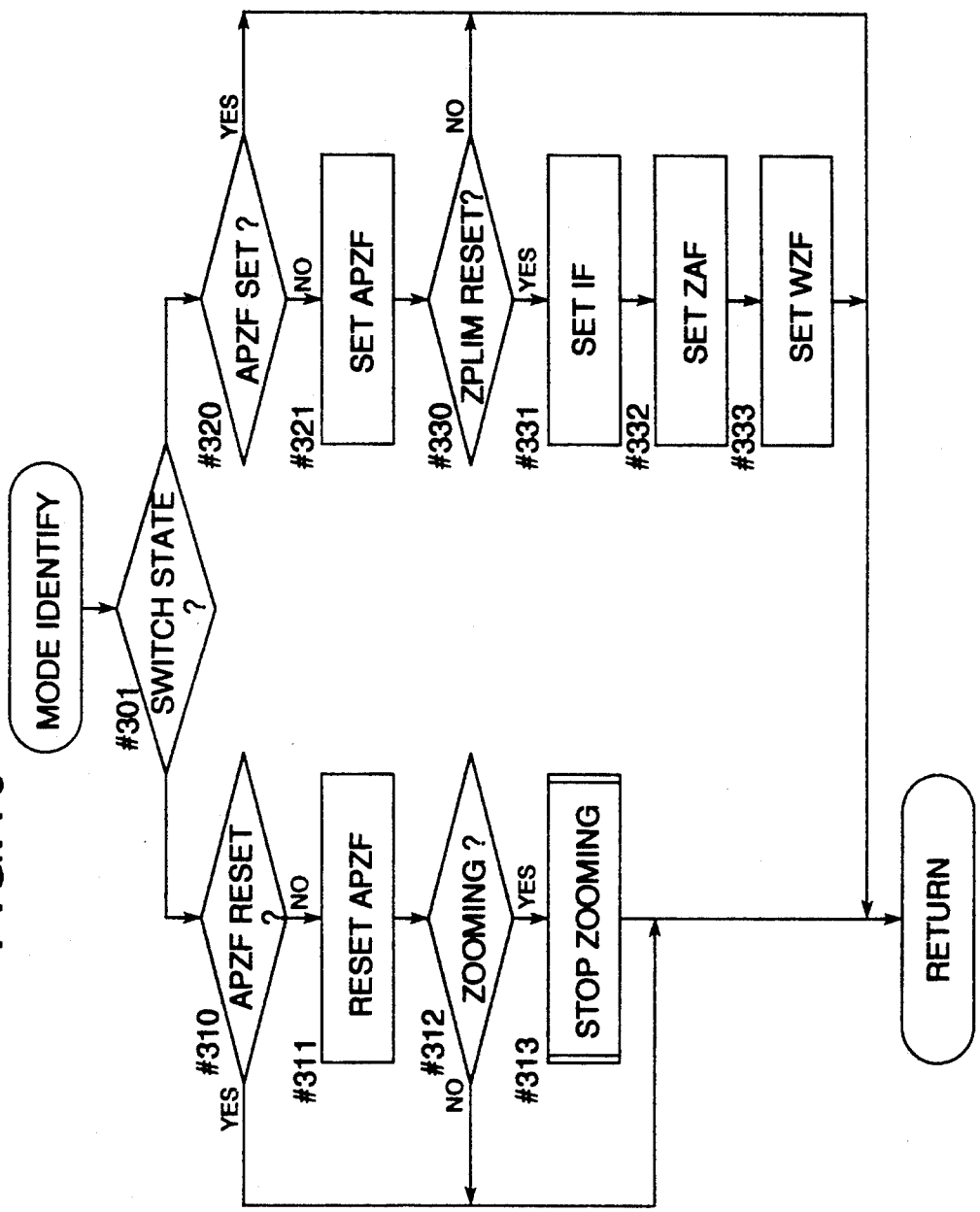

FIG. 10 shows a flowchart of the mode identifying subroutine. When this subroutine is called, the zoom mode switch 19 is checked at step #301. If the zoom mode switch 19 is operated for the normal mode, the auto mode flag APZF is checked at step #310 to identify the zoom mode which was in operation before this subroutine was called. If the auto mode flag APZF is reset which indicates that the previous zoom mode was in the normal mode, there is not need for a change to the zoom mode and the program returns to the main routine. If the auto mode flag APZF is set, this indicates that the previous zoom mode was in the auto mode and that switching has been made to the normal mode. Then the auto mode flag APZF is reset at step #311. Subsequently, a zooming flag INZF, which will be described later, is checked at step #312 to determine whether zooming is in progress or not. If zooming is not taking place, the program just returns to the main routine. Otherwise, a zoom drive stopping subroutine is called at step #313. Upon completion of this subroutine, the program returns to the main routine.

Figure 11:
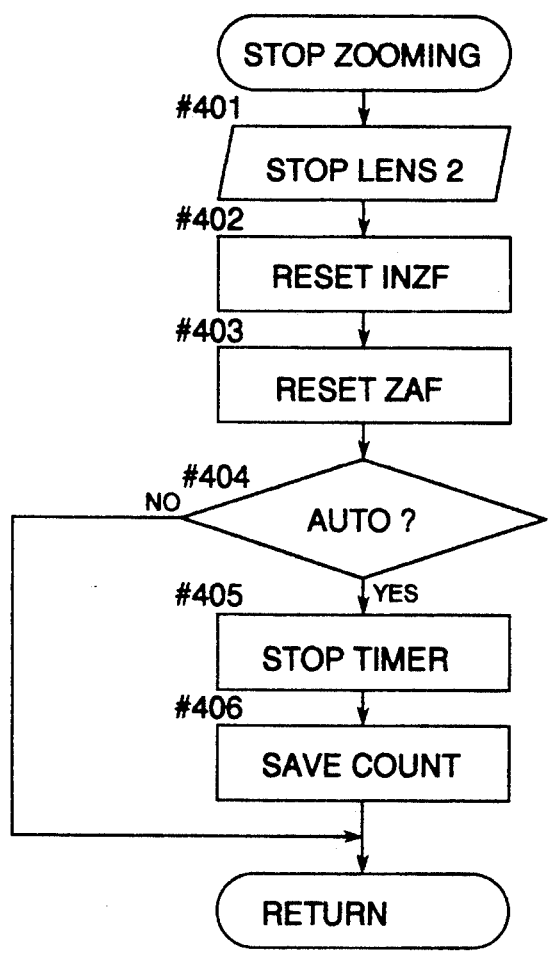

FIG. 11 shows a flowchart of the zoom drive stopping subroutine. When this subroutine is called, step #401 is executed to output the control signal to the zoom drive circuit 13 for stopping the movement of the variator means 2. Then, the zooming flag INZF is reset at step #402, the zoom permit flag ZAF is reset at step #403, and the auto mode flag APZF is checked at step #404 to determine the zoom mode. If it is in the auto mode, a timer for identifying divided parts of the regions, which will be described later, is stopped at step #405, and timer count TC is stored at step #406, which is followed by a return to the mode identifying subroutine. In the case of the normal mode, the program just returns to the mode identifying subroutine.

Returning to FIG. 10, if step #301 finds the zoom mode switch 19 operated for the auto mode, the auto mode flag APZF is checked at step #320 to identify the zoom mode which was in operation before this mode identifying subroutine was called. If the auto mode flag APZF is set which indicates that the previous zoom mode was in the auto mode, there is no need for a change to the zoom mode and the program returns to the main routine. If the auto mode flag APZF is reset, this indicates that the previous zoom mode was in the normal mode and that switching has been made to the auto mode. Then the auto mode flag APZF is set at step #321.

Subsequently, step #330 is executed to check whether the proximity limit distance ZPLIM is reset or not. As will be described later, the proximity limit distance ZPLIM is reset when zoom drive is effected in the normal mode. Presence or absence of zoom drive in the normal mode may be determined by checking whether the proximity limit distance ZPLIM is reset or not. If the proximity limit distance ZPLIM is not reset, this indicates that no zoom drive has been effected in the normal mode. Then the program returns to the main routine since the proximity limit distance ZPLIM for the provision auto mode is retained.

If the proximity limit distance ZPLIM is reset, this indicates that zoom drive has been effected in the normal mode. Since the variator lens 2 has been displaced from a previous position, the initial flag IF is set at step #331, the zoom permit flag ZAF at step #332 and the wide side drive flag WZF at step #333, all by way of preparation for initial setting of the initial proximity limit distance as at the time of initial power supply. Then the program returns to the main routine.

Referring back to FIG. 7, after the return from the mode identifying subroutine, the auto mode flag APZF is checked at step #008 to identify the zoom mode. If the zoom mode is in the normal mode, a focus adjusting subroutine is called at step #020 to effect focus adjustment based on the result obtained from the focus detecting subroutine called at step #002. The focus adjusting subroutine will be described later. If the zoom mode is in the auto mode, step #009 is executed to check the initial flag IF and determine whether initialization is in progress. If it is in progress, the zoom limit operating subroutine is called at step #010. Otherwise, an auto zoom operating subroutine is called at step #011.

Figure 12:
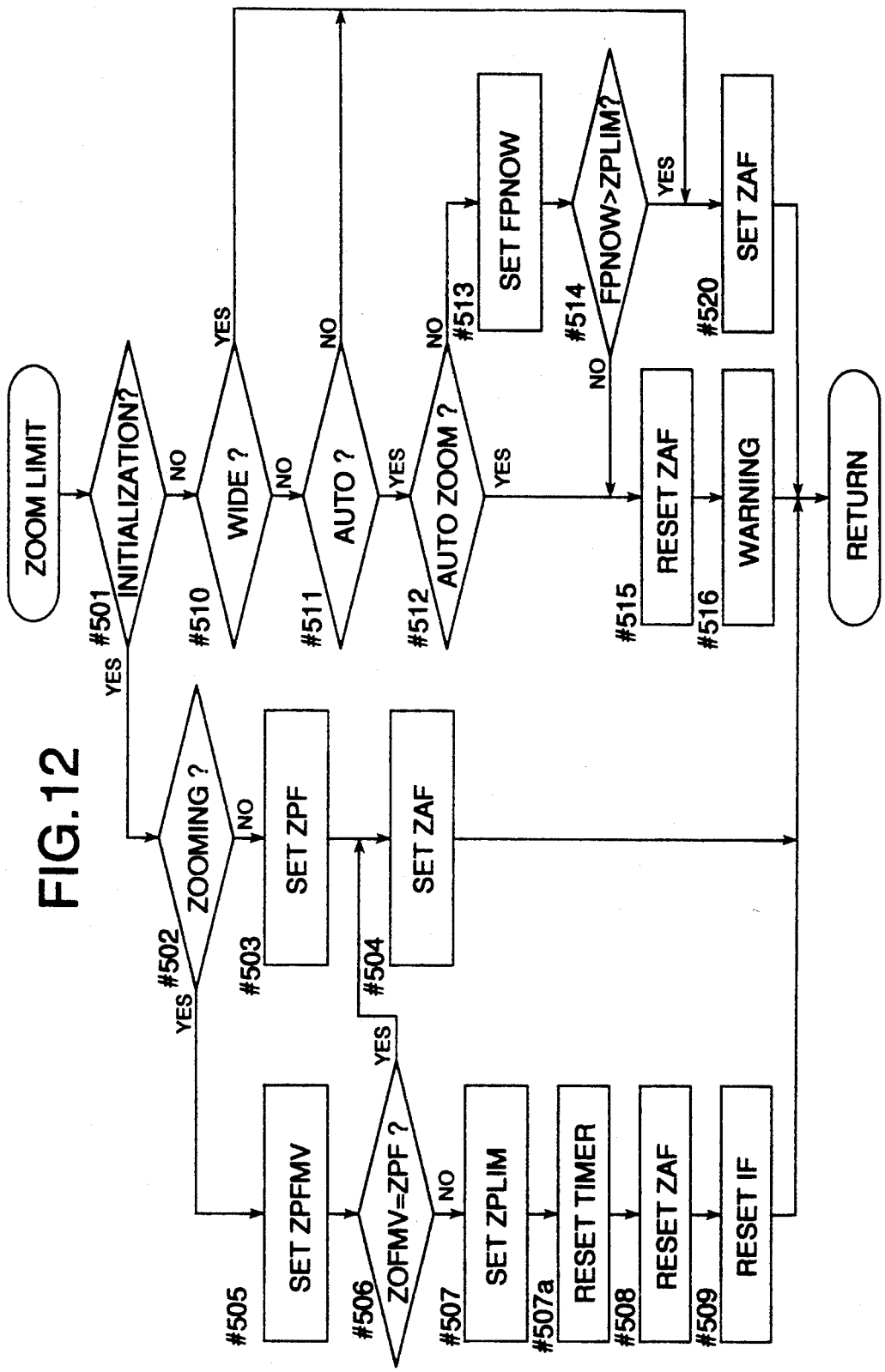

FIG. 12 shows a flowchart of the zoom limit operating subroutine. When this subroutine is called, the initial flag IF is checked at step #501 to determine whether initialization is in progress. If it is, step #502 is executed to determining whether zooming is in progress or not. If zooming is not taking place, current focal length information is read from the conducting pattern of the zoom encoder 16, which is set to be a reference focal length ZPF (step #503). Then the zoom permit flag ZAF is set at step #504 to start a zoom drive. Thereafter the program returns to the main routine.

On the other hand, if zooming is in progress, the current focal length information is similarly read and set to be a current focal length ZPFMV (step #505). Then step #506 is executed to compare the current focal length ZPFMV with the reference focal length ZPF obtained at step #503 prior to start of the zoom drive. When the two focal lengths agree, there is no change to the focal length condition. Thus, the zoom permit flag ZAF is set at step #504 to start the zoom drive. Thereafter the program returns to the main routine. If the two focal lengths differ, this indicates that initialization is in progress for zooming to the wide side, and that the focal length condition has shifted from the telephoto range to the middle range or from the middle range to the wide range. Subsequently, step #507 is executed to read the proximity limit distance corresponding to the divided part which is in that focal length condition and which is closest to the telephoto range, and set it to be the proximity limit distance ZPLIM. Then a timer for identifying the divided parts of the ranges, which will be described later, is reset at step #507a, the zoom permit flag ZAF is reset at step #508 to stop the zoom drive, and the initial flag IF is reset at step #509. Thereafter the program returns to the main routine. The above is the initial setting of the initial proximity limit distance in the initializing operation described in section (F) hereinbefore.

If step #501 finds that the initialization is not taking place, step #510 is executed to check the wide side drive flag WZF and telephoto side drive flag TZF in order to determine the zooming direction. If the zooming is effected to the wide side, the limitation to the zooming described later is unnecessary. Thus, the program returns to the main routine after setting the zoom permit flag ZAF at step #520.

If step #510 finds that the zooming is effected to the telephoto side, step #511 is executed to determine the zoom mode. If the zoom mode is in the normal mode, the limitation to the zooming is unnecessary. The program then returns to the main routine after setting the zoom permit flag ZAF at step #520.

If the zoom mode is in the auto mode, the program proceeds to effect the controls described in foregoing sections (A) and (B) since step #511 of this subroutine is executed only during the zoom operation initiated by manual depression of the telephoto key 12T. First, step #512 is executed to check an auto zoom driving flag IAZF to be described later, and determine whether auto zooming is in progress or not.

If the auto zooming is not taking place, step #513 is executed to derive information as to the position of focusing lens 3 from the output signal of the focus encoder 18, and to set it to be a current photographic distance FPNOW. This distance is compared with the proximity limit distance ZPLIM at step #514. When the current photographic distance FPNOW is greater than the proximity limit distance ZPLIM, the zoom permit flag ZAF is set at step #520 and the program returns to the main routine. If the current photographic distance FPNOW is found equal to or less than the proximity limit distance ZPLIM, the zoom permit flag ZAF is reset at step #515 and the zooming prohibit warning (FIG. 4B) is displayed at step #516. Then the program returns to the main routine. The above is the control described in section (B).

If step #512 finds the auto zooming in progress, this indicates that the telephoto key 12T has been depressed during the zooming operation. Then, as already described, the zoom permit flag ZAF is reset at step #515 to end the zooming operation, and the zooming prohibit warning is displayed at step #516. Then the program returns to the main routine. The above is the control described in section (A).

Returning to FIG. 7, after the return from the zoom limit operating subroutine, step #012 is executed to check the zoom permit flag ZAF and determine whether a zooming operation is permitted or not. If a zooming operation is permitted, a zoom drive subroutine is called at step #013. Otherwise, the zoom drive stopping subroutine is called at step #014.

Figure 13A:
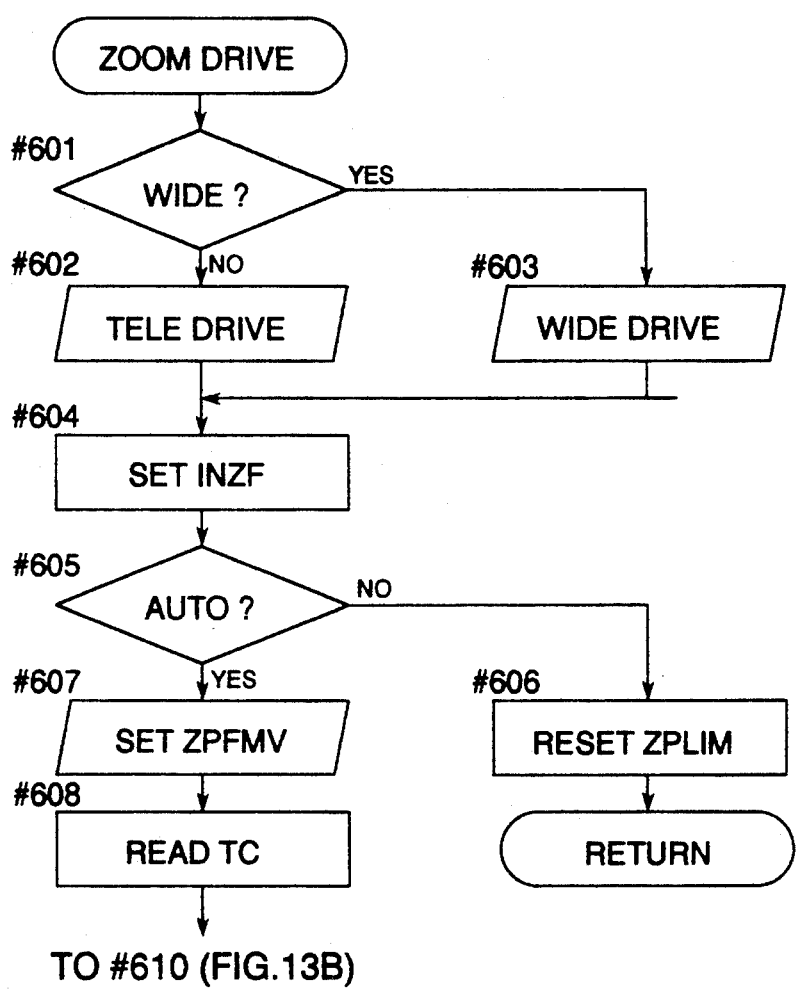
Figure 13B:
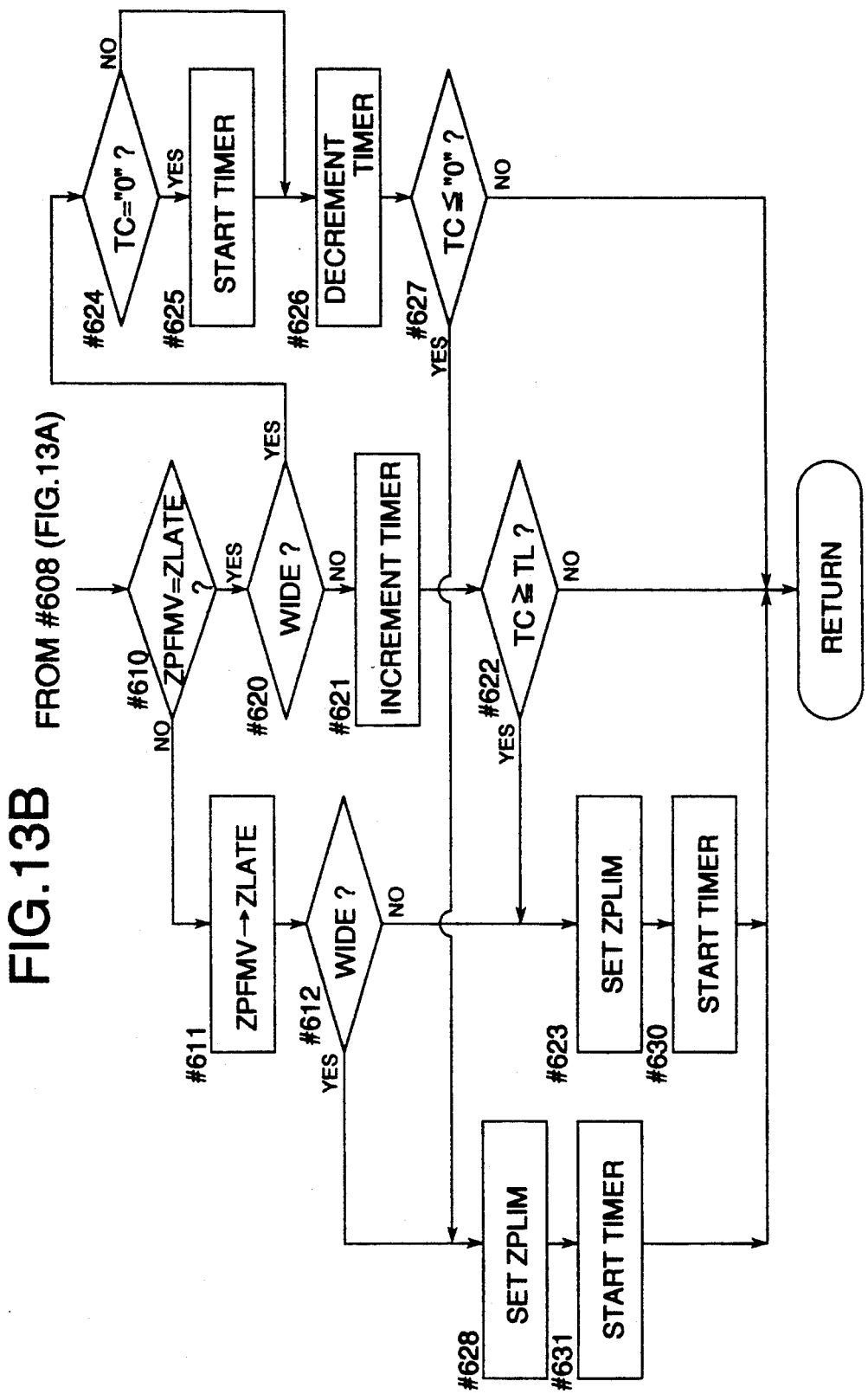

The zoom drive stopping subroutine has already been described. FIGS. 13A and 13B show a flowchart of the zoom drive subroutine. When this subroutine is called, step #601 is executed to determine the zooming direction by checking the wide side drive flag WZF and telephoto side drive flag TZF. If drive to the telephoto side is set, step #602 is executed to output the control signal to the zoom drive circuit 13 for moving the variator lens 2 to the telephoto side. If drive to the wide side is set, step #603 is executed to output the control signal for moving the variator lens 2 to the wide side. Then, the zooming flag INZF is set at step #604 to indicate that zooming is in progress. Subsequently, at step #605, the current zoom mode is determined by checking the auto mode flag APZF. If the zoom mode is in the normal mode, the proximity limit distance ZPLIM is reset at step #606 to indicated that zoom drive has been effected in that mode. Then the program returns to the main routine.

If the zoom mode is in the auto mode, current focal length information is read from the conducting pattern of the zoom encoder 16, which is then set to be a current focal length ZPFMV (step #607). Next, step #608 is executed to read the time count TC saved in the zoom drive stopping subroutine described earlier. Subsequently, at step #610 in the flowchart of FIG. 13B, the current focal length ZPFMV is compared with a previous focal length ZLATE set when this subroutine was called last.

If the two focal lengths agree, this indicates there is no change in the focal length condition among the three major ranges, i.e. wide, middle and telephoto ranges. Then the program moves to a subroutine for identifying the divided parts within one range.

Each of the major ranges is divided into equal parts as described hereinbefore, and a shift from one divided part to another is controlled by using a timer for identifying the divided parts. The zooming operation in the auto mode is carried out at a constant speed, and the above timer expires in a period of time which is derived from the period required for passing through one major range such as the telephoto range or middle range divided by the number of divided parts. This timer is incremented during zooming to the telephoto side, and decremented during zooming to the wide side. When the zooming is stopped in the auto mode, the timer is stopped and its count TC is saved as already described with reference to FIG. 11. The timer count TC is read at step #608 as above, and the time count by this timer is resumed. As will be described in detail hereinafter, it is determined that a shift is made from one divided part to a next divided part when the timer count TC reaches a predetermined count or "0".

In the divided part identifying subroutine, step #620 is executed first to determine the zooming direction by checking the wide side drive flag WZF and telephoto side drive flag TZF. If drive to the telephoto side is set, step #621 is executed to increment the timer. Then, at step #622, checking is made whether timer count TC has reached the predetermined count TL. If the count TC is less than the predetermined count TL, the program returns to the main routine. If the count TC reaches the predetermined count TL, this indicates that the drive to the telephoto side is being carried out. Then, step #623 is executed to read the proximity limit distance corresponding to the divided part next to the current divided part in the direction of the telephoto side, and it is set to be the proximity limit distance ZPLIM. Then the timer is reset and started at step #630, and the program returns to the main routine.

If step #620 finds the drive set to the wide side, the program moves to step #624 for checking whether the timer count TC is "0" or not. If the count TC is "0", this indicates that the variator lens 2 is standing still with the initialization completed. Then, step #625 is executed to start the timer after setting the predetermined expiration count TL to be the timer count TC in preparation for timer count decrements. Thereafter, the timer is decremented at step #626. If the timer count is not "0", the program jumps from step #624 to step #626 for decrementing the timer. Thereafter, at step #627, checking is made whether timer count TC has reached "0". If the count TC is not yet "0", the program returns to the main routine. If the count TC reaches "0", this indicates that the drive to the wide side is being carried out. Then, step #628 is executed to read the proximity limit distance corresponding to the divided part next to the control divided part in the direction of the wide side, and it is set to be the proximity limit distance ZPLIM. Then the timer is started at step 631, with the expiration count TL set to be the timer count TC, and the program returns to the main routine.

If step #610 finds the current focal length ZPFMV and previous focal length ZLATE in disagreement, this indicates a change in the focal length condition among the three major ranges, i.e. wide, middle and telephoto ranges. Then, step #611 is executed the current focal length ZPFMV is set to be the previous focal length ZLATE for serving as reference when this subroutine is called and step #610 is executed the next time. Then, step #612 is executed to determine the zooming direction. Depending on the result, and as in the case of a shift from one divided part to another, step #623 or #628 is executed to read the proximity limit distance corresponding to the divided part next to the current divided part in the direction of the wide side or the telephoto side, and it is set to be the proximity limit distance ZPLIM. Then the timer is set or rest and started at step #630 or #631, and the program returns to the main routine.

Returning to FIG. 7, after the return from the zoom drive or zoom drive stopping subroutine called as a result of step #012, the focus adjusting subroutine is called at step #020. This subroutine will be described later.

On the other hand, the auto mode is set and the initialization is not taking place upon return from the mode identifying subroutine called at step #007, the program moves through step #008 and #009 to step #011 for calling the auto zoom operating subroutine.

Figure 14B:
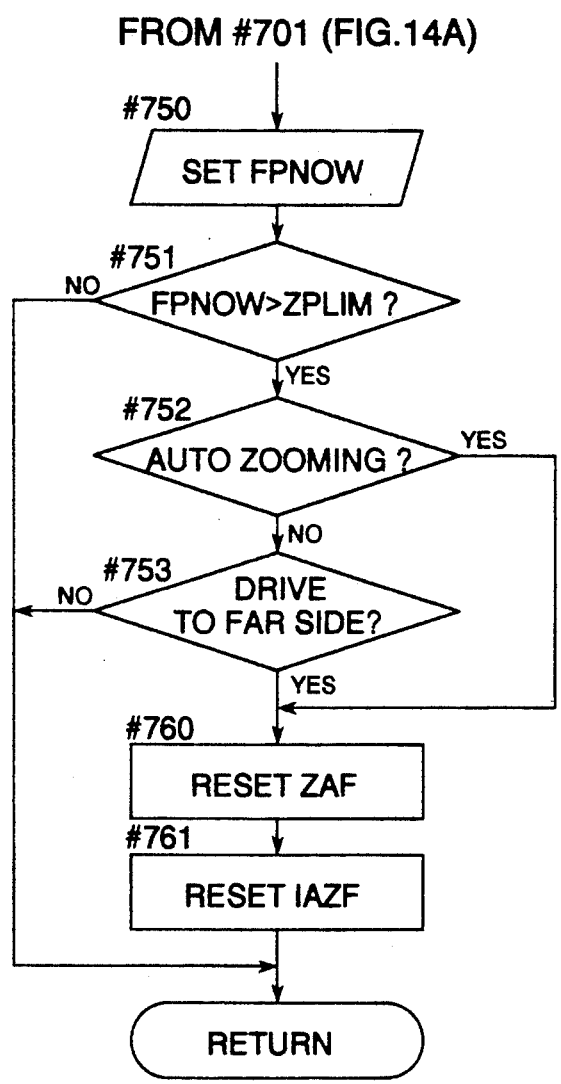

FIGS. 14A and 14B show a flowchart of the auto zoom operating subroutine. When this subroutine is called, step #701 is executed to check the zooming flag INZF and to determine whether zooming is in progress.

If zooming is not taking place, step #702 is executed to derive information as to the position of focusing lens 3 from the output signal of the focus encoder 18, and it is set to be a current photographic distance FPNOW, in order to determine whether to carry out an auto zooming operation next or not. This distance is compared with the proximity limit distance ZPLIM at step #703.

When the current photographic distance FPNOW does not exceed the proximity limit distance ZPLIM, a limit zoom flag LZF is set at step #710, and a virtual zoom flag IZF is reset at step #711. Then, after setting the wide side drive flag WZF, zoom permit flag ZAF and auto zooming flag IAZF at step #730 through #732, the program returns to the main routine.

If step #703 finds the current photographic distance FPNOW greater than the proximity limit distance ZPLIM, the program proceeds to determine whether to carry out a virtual auto zooming operation or not.

First, step #720 is executed to determine the direction in which the focusing lens 3 is driven, by checking the far side drive flag set or reset in the focus detecting subroutine. If the focusing lens 3 is driven to the far side, the virtual auto zooming operation is unnecessary. So the program returns to the main routine after resetting the zoom permit flag ZAF at step #740. If the focusing lens 3 is driven to the near side, the auto zooming operation is prohibited when the defocus amount obtained is greater than a maximum defocus amount set for zooming purposes, as described hereinbefore with reference to FIG. 5. Thus, step #721 is executed to read the set maximum defocus amount and it is set to be a maximum defocus amount MAXFP. Then, at step #722, this amount is compared with the defocus PDF obtained in the focus detecting subroutine.

If the defocus PDF is equal to or greater than the maximum defocus amount MAXFP, the virtual auto zooming operation is prohibited. Thus the program returns to the main routine after resetting the zoom permit flag ZAF at step #740. If the defocus PDF is smaller than the maximum defocus amount MAXFP, step #723 is executed to add the driving amount of the focusing lens 3 based on the defocus PDF to the present position of the focusing lens 3 (i.e. the current photographic distance FPNOW) in order to obtain a predicted photographic distance ZPTOTAL which is compared with the proximity limit distance ZPLIM at step #724.

If the predicted photographic distance ZPTOTAL is greater than the proximity limit distance ZPLIM, there is not need for the virtual auto zooming operation. So the program returns to the main routine after resetting the zoom permit flag ZAF at step #740. If the predicted photographic distance ZPTOTAL is equal to or less than the proximity limit distance ZPLIM, the virtual zoom flag IZF is set at step #725 for effecting the virtual auto zooming operation. At step #726, the limit zoom flag LZF is reset, and after setting the wide side drive flag WZF, zoom permit flag ZAF and auto zooming flag IAZF at step #730 through #732, the program returns to the main routine. The above is the control described in section (C) hereinbefore.

The control for ending the auto zooming operation will be described next. If step #701 finds that zooming is in progress, the program moves to the flowchart of FIG. 14B. Then, step #750 is executed to derive information as to the position of focusing lens 3 from the output signal of the focus encoder 18, and it is set to be the current photographic distance FPNOW. This distance is compared with the proximity limit distance ZPLIM at step #751.

When the current photographic distance FPNOW does not exceed the proximity limit distance ZPLIM, the program just returns to the main routine since it is necessary to continue the auto zooming operation. If the current photographic distance FPNOW exceeds the proximity limit distance ZPLIM, step #752 is executed to check the limit zoom flag LZF and to determine whether the limit auto zooming operation is in progress. If the limit auto zooming operation is in progress, the zoom permit flag ZAF is reset at step #760 to end the zooming operation, and the auto zooming flag IAZF is reset at step #761. Then the program returns to the main routine. The above is the control described in section (D).

If step #752 finds no limit for the auto zooming operation in progress, this indicates that the virtual auto zooming operation is in progress. Then, step #753 is executed to determine the direction in which the focusing lens 3 is driven, by checking the far side drive flag FFF. If the focusing lens 3 is driven to the near side, the virtual auto zooming operation is continued. So the program just returns to the main routine. If the focusing lens 3 is driven to the far side, the virtual auto zooming operation is terminated. Thus, the program returns to the main routine after resetting the zoom permit flag ZAF and auto zooming flag IAZF. The above is the control described in section (E).

Returning to FIG. 7, after the return from the auto zoom operating subroutine, step #015 is executed to check the zoom permit flag ZAF and to determine whether a zooming operation is permitted or not. If a zooming operation is permitted, the zoom drive subroutine is called at step #013. Otherwise, step #016 is executed to check the zooming flag INZF and determine whether a zooming operation is currently in progress. If it is, the zoom drive stopping subroutine is called at step

014. Otherwise, the focus adjusting subroutine is called at step #020.

Figure 15:
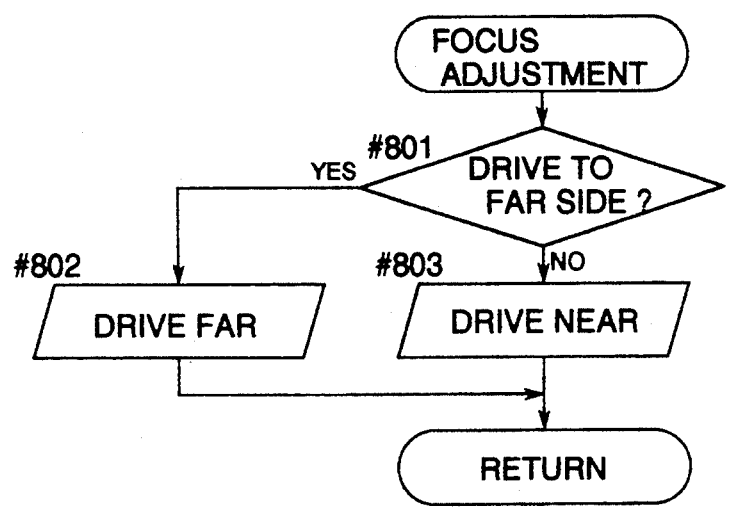

The zoom drive and zoom drive stopping subroutine have already been described. FIG. 15 shows a flowchart of the focus detecting subroutine. When this subroutine is called, step #801 is executed to check the far side drive flag FFF and to determine the direction in which the focusing lens 3 is driven. If a drive to the far side is set, step #802 is executed to output the control signal to the focus adjusting drive circuit 10 for moving the focusing lens 3 to the far side. If a drive to the near side is set, step #803 is executed to output the control signal for moving the focusing lens 3 to the near side. Then, the program returns to the main routine.

By way of further explanation of the operation in the focus adjusting subroutine, an autofocusing operation is carried out in accordance with movement of the photographic object or the like while the focal length is maintained constant, and also the focusing lens 3 is moved with variations in the focal length. That is, when the focal length is varied by moving the variator lens 2, with the focusing lens 3 fixed, the photographic optical system S will deviate from the in-focus condition with respect to the photographic object as seen from the graph of FIG. 2. This will result in a deviation detected in the focus detecting subroutine called subsequently. In the focus adjusting subroutine, the focusing lens 3 is moved on the basis of the deviation detected, thereby following variations in the focal length as shown in FIG. 2. Such movement is of course effected in entirely the same way in the auto mode and normal mode.

Referring back to FIG. 7, after the return from the focus adjusting subroutine, the program returns to step #002 and repeats the foregoing operations.

Other embodiments of the present invention will be described hereunder.

(1) In the described embodiment, the proximity limit distance increases stepwise toward the long focal length side as shown in FIG. 2. The number of such steps is variable as desired. Of course, the number of major ranges detected through the conducting pattern of zoom encoder 16 may be other than three, and each range may be divided into five or more parts. The zoom encoder 16 may have increased resolution so that all focal length conditions are detected on the basis of the output signal of the zoom encoder 16. The zoom encoder 16 may comprise a photo-interrupter or other optical device rather than the mechanical type having the contacting brush 15. The variator lens position detecting unit may comprise, instead of the zoom encoder 16 described in the foregoing embodiment, a plurality of magnetic type or capacitance type proximity switches for providing output signals to be processed. The proximity limit distance may vary continuously rather than stepwise.

(2) The focusing lens position detecting unit may also be varied as in (1) above. Instead of the stepper motor for driving the focusing lens 3, the focusing motor 11 may comprise the type operable under feedback control based on the detection results provided by the focusing lens position detecting unit.

(3) The camera of the present invention is not limited to the described lens arrangement in the photographic optical system S since the proximity limit distance is set independently of the shortest photographic distance determined mechanically by the moving range of the focusing lens 3. Some examples of proximity limit distance and photographic range thereby limited in other photographic optical systems than the lens arrangement in the foregoing embodiment will be described now.

Figure 16A:
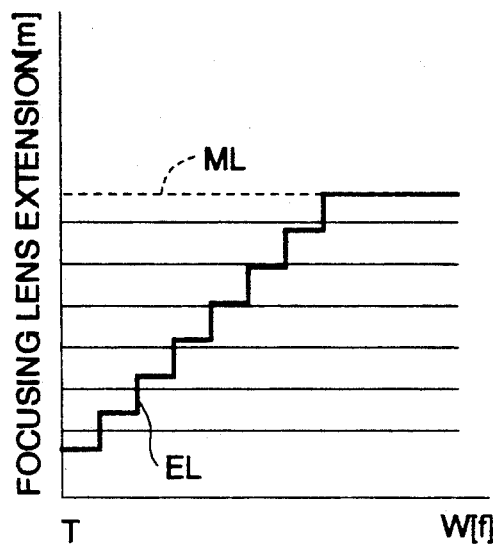
FIGS. 16A and 16B are graphs showing a relationship between focal length and focusing lens extension in different embodiments.
Figure 17A:
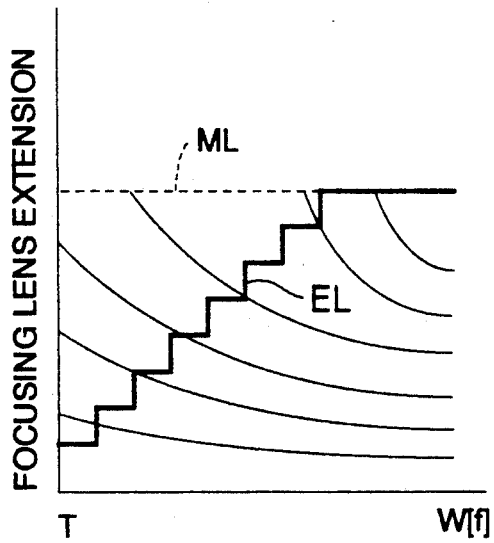
FIGS. 17A and 17B are graphs showing a relationship between focal length and shortest photographic distance in the embodiment of FIGS. 16A and 16B, respectively.

FIG. 16A shows a photographic optical system of the front lens moving type. The focusing lens does not move even when the focal length is varied in an in-focus condition with respect to an object at a certain photographic distance. Horizontal lines of movement are drawn as represented by thin solid lines in FIG. 16A. FIG. 17A shows a photographic optical system of the inner focus type. The focusing lens is extended to the greater extent the greater the focal length is when the focal length is varied in an in-focus condition with respect to an object at a certain photographic distance. Rightwardly inclined lines of movement are drawn as represented by thin solid lines in FIG. 17A.

Figure 16B:
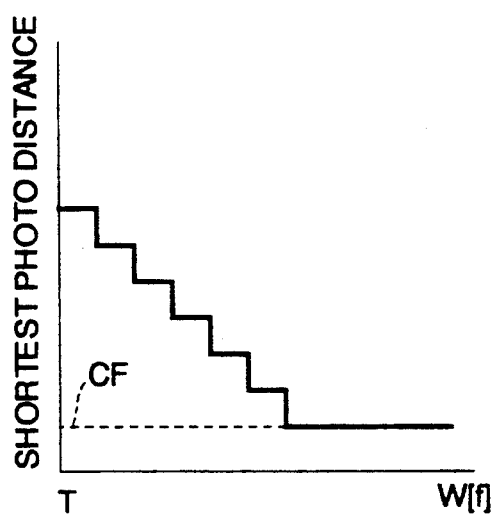
Figure 17B:
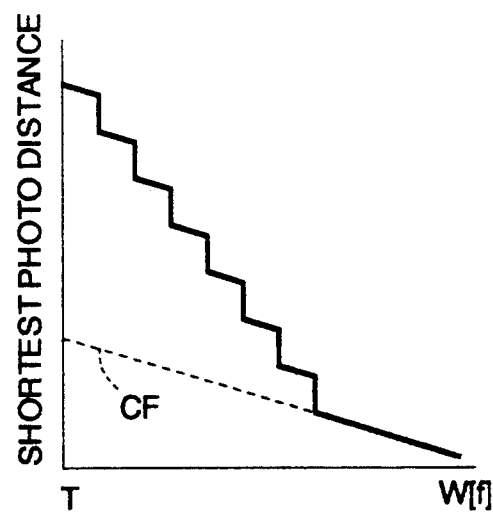

The proximity limit distances are represented by thick solid lines, which are set for the photographic optical systems having the lens characteristics shown in FIGS. 16A and 17A. The shortest photographic distances mechanically determined are represented by broken lines in these drawings. Consequently, the shortest photographic distances vary in the system of FIG. 16A as shown in the solid line in FIG. 16B, and in the system of FIG. 17A as shown in the solid line in FIG. 17B. The broken lines in FIGS. 16B and 17B represent the closest photographic distances determined according to the shortest photographic distances.

Thus, with the front lens moving type photographic optical system shown in FIG. 16A, the photographic range may be limited by the proximity limit distance according to the present invention, as compared with the system in which the photographic range only from the shortest photographic distance is the same regardless of the focal length. With the inner focus type photographic optical system shown in FIG. 17A, the photographic range may be limited to a greater range by the proximity limit distance according to the present invention, as compared with a system in which the closest photographic distance is determined by the shortest photographic distance.

(4) The focus detection by the focus detecting unit may employ not only a phase difference method, but various methods such as an active method utilizing infrared radiation or ultrasonic oscillation.

(5) The distance information detecting unit described in the foregoing embodiment may be replaced by a device utilizing infrared radiation or ultrasonic wave for detecting a distance to a photographic object independently of the information on the variator lens position and focusing lens position. Where a active type focus detecting unit is employed as noted in paragraph (4) above, the distance information detecting unit may be used also as focus detecting circuit.

(6) In the foregoing embodiment, zooming is effected to the wide side for initial setting of the initial proximity limit distance during the initializing operation. For this purpose, zooming may be effected to the telephoto side instead.

(7) In the foregoing embodiment, the virtual auto zooming operation is terminated when the direction in which the focusing lens 3 is driven is changed from the extension side to the retraction side. Instead, the virtual auto zooming operation may be terminated when the predicted photographic distance exceeds the proximity limit distance, which is based on constant comparison made between the two distances during the virtual auto zooming operation.

(8) For terminating the limit auto zooming operation after this zooming operation is initiated, the foregoing embodiment employs the point of time at which the photographic distance exceeds the proximity limit distance since the proximity limit distance is variable stepwise in accordance with the focal length. Where the proximity limit distance is continuously variable with the focal length, the point of time at which the photographic distance coincides with the proximity limit distance will also vary. Further, variations in the focal length may be stopped at the point of time when the photographic distance deviates to a certain extent from the proximity limit distance regardless of the way in which the proximity limit distance is set (that is, apart from the proximity limit distance, a stopping control distance is set for each focal length, and the variations may be stopped when the stopping control distance is reached). In carrying out the limit auto zooming operation and virtual auto zooming operation, while the current or predicted photographic distance is less than the proximity limit distance, an indication to that effect may be displayed continuously with the viewfinder image. In this case, when the photographic distance becomes greater than the proximity limit distance, the auto zooming operation is continued, with only the above indication eliminated. This will enable the photographer to stop the auto zooming operation at a selected timing for providing a desired field angle by depressing the telephoto key 12T or other stop key.

(9) The present invention is applicable, besides the video camera described in the foregoing embodiment, also to a movie camera, a still camera which uses ordinary films for photographing still pictures, and an electronic still camera.

(10) In the foregoing embodiment, the proximity limit distance set is the greater the longer the focal length is in order to avoid an excessive high photographic magnification. The variator lens is automatically zoomed to the wide side when a photographic object is closer to the camera than the proximity limit distance. Conversely, the limit distance may be set the smaller the shorter the focal length is in order to avoid an excessively low photographic magnification. Then the variator lens is automatically zoomed to the telephoto side when a photographic object is farther from the camera than this limit distance. This operation is controllable in exactly the same way as for zooming to the wide side based on the proximity limit distance.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera having a zoom lens system, comprising:
   detecting means for detecting an object condition about an object to be photographed;
   an operating member;
   driving means for driving said zoom lens system in order to change a focal length thereof when said operating member is manually operated; and
   restricting means, based on the result of said detecting means, for restricting an operation of said driving means within a predetermined range of focal lengths.

2. A camera as claimed in claim 1, wherein said detecting means detects an object distance.

3. A camera as claimed in claim 1, wherein said detecting means detects a magnification of an object.

4. A camera as claimed in claim 1, wherein each of said predetermined range of focal lengths is from the shortest focal length to a focal length between the shortest focal length and the longest focal length.

5. A camera as claimed in claim 4, further comprising, warning means for warning when said driving means drives said zoom lens system beyond said predetermined range of focal length.

6. A camera as claimed in claim 5, wherein said warning means includes display means for displaying warning in a viewfinder.

7. A camera as claimed in claim 2, further comprising,
   focal length detecting means for detecting a focal length of said zoom lens system and automatically actuating said driving means, based on the result of said focal length detecting means, for automatically driving said zoom lens system in order to set a specific focal length and wherein said automatically driving means functions beyond said predetermined range of focal length.

8. A camera having a zoom lens system, comprising:
   first detecting means for detecting an object distance about an object to be photographed;
   second detecting means for detecting a focal length of said zoom lens system;
   driving means for driving said zoom lens system;
   drive controlling means, based on the result of said first detecting means, for automatically controlling said driving means in order to set a specific focal length;
   judging means for judging whether the focal length detected by said second detecting means is in a first focal length region or a second focal length region;
   first controlling means operable when said judging means judges that the focal length is in the first focal length region, for activating said driving controlling means, and
   second controlling means operable when said judging means judges that the focal length is in the second focal length region, for preventing the operation of said drive controlling means even if the focal length detected by said second detecting means does not accord with the specific focal length.

9. A camera as claimed on claim 8, further comprising second drive controlling means for controlling said driving means in response to a manual operation and wherein said drive controlling means controls said driving means so as to drive said zoom lens system in the direction toward the shortest focal length.

10. A camera as claimed in claim 9, further comprising a manually operating member for changing the focal length and prohibition means for prohibiting any changing of the focal length in the direction toward the longest focal length during a time period when said driving means drives said zoom lens system automatically.

11. A camera as claimed in claim 8, wherein the first focal length region is from a longest focal length to a focal length corresponding to the distance detected by said first detecting means.

12. A camera as claimed in claim 11, wherein the second focal length region is from a shortest focal length to the focal length corresponding to the distance detected by said first detecting means.

13. A camera having a zoom lens system, comprising:

first detecting means for detecting a focus condition on an object to be photographed;

adjusting means for adjusting a focusing lens of said zoom lens system in order to realize an in-focus condition based on the result of said first detecting means;

second detecting means for detecting a position of said focusing lens;

third detecting means for detecting a moving amount of said focusing lens from the infinity focusing position based on the result of said first and second detecting means, said moving amount being necessary to realize the in-focus condition;

judging means for judging whether or not the detected moving amount is larger than a predetermined amount; and driving means for driving said zoom lens system in order to change a focal length thereof when said judging means judges the detecting moving amount is larger than the predetermined amount.

14. A camera as claimed in claim 13, further comprising, fourth detecting means for detecting a focal length of said zoom lens system and wherein said third detecting means detects the moving amount based on the result of said first, second and fourth detecting means.

15. A camera having a zoom lens system, comprising;
first detecting means for detecting an object distance about an object to be photographed;

driving means, based on the result of said first detecting means, for automatically driving said zoom lens system in a first direction in order to set a specific focal length;

an manually operable member for changing a focal length of said zoom lens system;

judging means for judging whether or not said first direction corresponds to a second direction in which the zoom lens system is driven with said manually operable member; and stopping means for stopping an operation of said driving means when judging means judges that said first direction does not correspond to said second direction.

16. A camera as claimed in claim 15, further comprising, focus detection means for detecting a focus condition of the object and wherein said focus detection means detects a focus condition irrespective of the result of said judging means.

17. A camera as claimed in claim 15, wherein said stopping means cancels the stopping condition when said manually operable member is not operated.

18. A camera as claimed in claim 15, wherein said first direction is a direction toward the shortest focal length.

19. A camera as claimed in claim 15, wherein said stopping means does not stop the operation of said driving means when said judging means judges that said first direction corresponds to said second direction.

20. A camera having a zoom lens system divided into several ranges of focal length, comprising;
a manually operating member;
driving means for driving said zoom lens system when said manually operating member is operated;
first detecting means for detecting which range said zoom lens is in;
second detecting means for detecting a moving amount of said zoom lens system; and
resetting means for resetting the moving amount detected by said second detecting means in response to said first detecting means detecting when said zoom lens moves from one range to another range.

21. A camera as claimed in claim 20, further comprising third detecting means for detecting a focal length based on the results of said first and second detecting means.

22. A camera as claimed in claim 20, wherein said second detecting means detects the moving amount by means of a timer.

23. A camera as claimed in claim 20, wherein said manually operating member is a main switch of said camera.

24. A camera as claimed in claim 22, wherein said driving means stops the driving operation in response to a detection by said first detecting means that said zoom lens moves from one range to another range.

25. A camera as claimed in claim 20, wherein said driving means drives said zoom lens in a direction to a shortest focal length.

26. A camera having a driven member divided into several ranges of amounts of movement, comprising:
a manually operating member;
driving means for driving said driven member when said manually operating member is operated;
first detecting means for detecting which range said driven member is in;
second detecting means for detecting a moving amount of said driven member; and
resetting means for resetting the moving amount detected by said second detecting means in response to a detection by said first detecting means that said driven member is driven from one range to another range.

27. A camera having a zoom lens system, comprising:
driving means for driving said zoom lens system;
automatic zooming means for automatically controlling said driving means;
manual zooming means for controlling said driving means in response to a manual operation;
detecting means for detecting a focal length of said zoom lens system;
judging means for judging whether the focal length detected by said detecting means is in a first focal length region or a second focal length region, and
controlling means for controlling said automatic zooming means and said manual zooming means so that only said automatic zooming means is operable when the focal length detected by said detecting means is in the first focal length region and only said manual zooming means is operable when the focal length detected by said detecting means is in the second focal length region.

28. A camera having a zoom lens system, comprising:
first detecting means for detecting an object distance to an object to be photographed;
determining means for determining a specific focal length based on the result of said first detecting means;
second detecting means for detecting a focal length of said zoom lens system;
driving means for driving said zoom lens system in order to change a focal length thereof;
first drive controlling means for driving said driving means in a first direction in order to change a focal length of said zoom lens system toward the specific focal length and for stopping said driving means when the focal length of said zoom lens system reaches the specific focal length;

an operating member;

second drive controlling means for driving said driving means in a second direction corresponding to an operation of said operating member, and controlling means, operable after an operation of said first drive controlling means, for preventing an operation of said second drive controlling means, if the second direction does not accord with the first driving direction and for permitting the operation of said second drive controlling means, if the second direction accords with the first direction.

29. A camera as claimed in claim 28, further comprising, warning means for warning when the second direction does not accord with the first direction.

30. A camera as claimed in claim 29, wherein said warning means includes a display means for displaying a warning indication in a viewfinder.

* * * * *